(12) United States Patent
Aoki et al.

(10) Patent No.: US 6,575,378 B2
(45) Date of Patent: Jun. 10, 2003

(54) SOLAR RADIATION DETECTION UNIT AND VEHICLE AIR CONDITIONER USING THE SAME

(75) Inventors: Shinji Aoki, Kariya (JP); Akihisa Izuhara, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/060,951

(22) Filed: Jan. 30, 2002

(65) Prior Publication Data
US 2002/0125332 A1 Sep. 12, 2002

(30) Foreign Application Priority Data

| Feb. 2, 2001 | (JP) | ................................. 2001-027441 |
| Apr. 2, 2001 | (JP) | ................................. 2001-103546 |
| Jan. 25, 2002 | (JP) | ................................. 2002-017297 |

(51) Int. Cl.[7] .............................. G05D 23/00; F24F 7/00
(52) U.S. Cl. .................................... 236/49.3; 236/91 C
(58) Field of Search .............................. 236/49.3, 91 C; 165/204; 250/203.4

(56) References Cited

U.S. PATENT DOCUMENTS 5,676,204 A  * 10/1997 Samukawa et al. .......... 165/204
6,012,297 A  *  1/2000 Ichishi et al. ................ 165/204

FOREIGN PATENT DOCUMENTS

| JP | 5-254330 | 10/1993 | ............ B60H/1/00 |
| JP | 8-175150 | 7/1996 | ............ B60H/1/00 |
| JP | 9-132020 | 5/1997 | ............ G01J/1/02 |
| JP | 2000-62433 | 2/2000 | ............ B60H/1/00 |

* cited by examiner

*Primary Examiner*—William Wayner
(74) *Attorney, Agent, or Firm*—Harness, Dickey & Pierce, PLC

(57) ABSTRACT

The air conditioning controller for controlling a vehicle air conditioner provided for a vehicle equipped with a navigation system includes a solar radiation sensor disposed in a front part of the vehicle, the solar-radiation direction calculating means which computes presence or absence of solar radiation entering the vehicle and an entering direction on the basis of solar position information determined from a solar position retrieval map and road information including information of structures around the road, and the solar-radiation amount calculating means for determining the solar radiation amount on based on the calculation results of the solar-radiation direction calculating means and the detected value of the solar radiation sensor. Further, the solar-radiation amount calculating means determines the solar radiation amount by correcting the detected value of the solar radiation sensor.

21 Claims, 14 Drawing Sheets

FIG. 8A
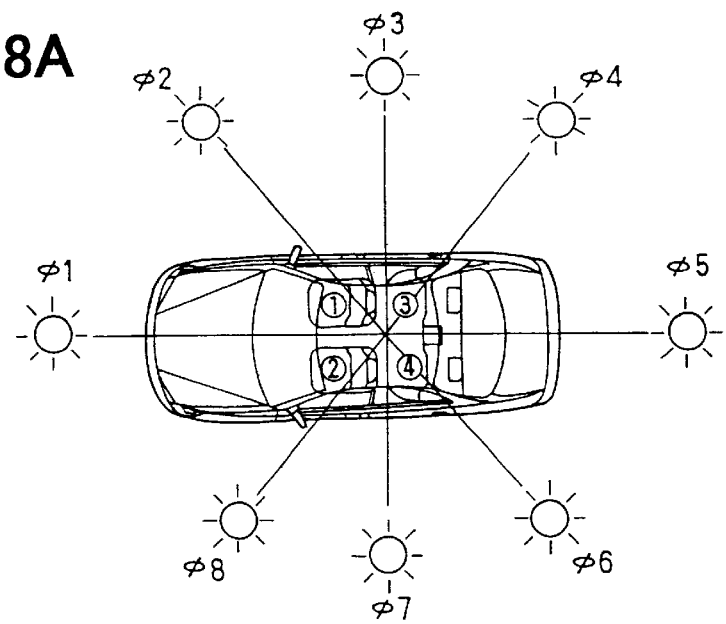
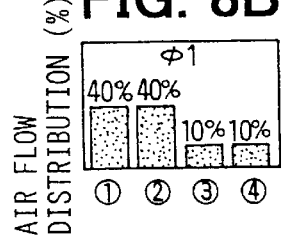
FIG. 8B
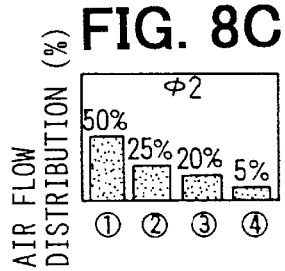
FIG. 8C
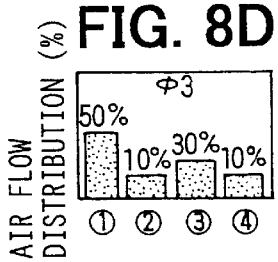
FIG. 8D
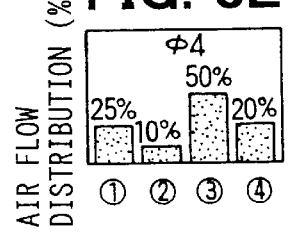
FIG. 8E
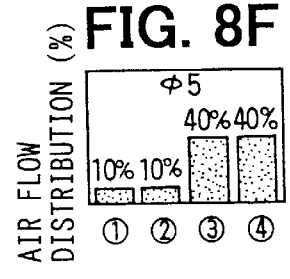
FIG. 8F
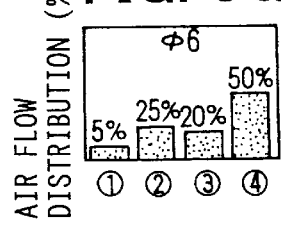
FIG. 8G
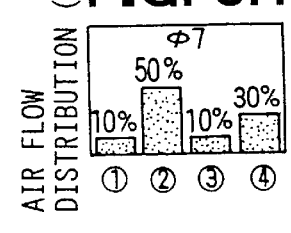
FIG. 8H
FIG. 8I

FIG. 12A

| θ: 30° | | | | | AREA: TOKYO | |
| θ: 20° | | | | | AREA: TOKYO | |
| θ: 10° | | | | | AREA: TOKYO | UNIT: W/m² |

| DATE / TIME | 1DAY | 2DAY | 3DAY | 4DAY | 5DAY |
|---|---|---|---|---|---|
| 0 (hr.) | 0.0 | 0.0 | 0.0 | 0.0 | |
| 1 (hr.) | 0.0 | 0.0 | 0.0 | | |
| 2 (hr.) | 0.0 | 0.0 | 0.0 | | |
| 3 (hr.) | 0.0 | | | | |

FIG. 12B

| PASSENGER: REAR LEFT | AREA: TOKYO |
| PASSENGER: REAR RIGHT | AREA: TOKYO |
| PASSENGER: FRONT LEFT | AREA: TOKYO |
| PASSENGER: FRONT RIGHT | AREA: TOKYO |

| θ \ φ | 0° | 10° | 20° | 30° | 40° |
|---|---|---|---|---|---|
| 0° | 0.00 | 0.00 | 0.00 | 0.00 | |
| 10° | 0.01 | 0.12 | 0.14 | 0.16 | |
| 20° | 0.20 | 0.24 | 0.28 | | |
| 30° | 0.35 | 0.40 | | | |

SOLAR RADIATION DETECTION UNIT AND VEHICLE AIR CONDITIONER USING THE SAME

CROSS-REFERENCE TO RELATED APPLICATION

This application is related to and claims priority from Japanese Patent Applications No. 2001-27441 filed on Feb. 2, 2001, No. 2001-103546 filed on Apr. 2, 2001, and No. 2002-17297 filed on Jan. 25, 2002, the contents of which are hereby incorporated by reference.

FIELD OF THE INVENTION

The present invention relates to a solar radiation detection unit for a vehicle for detecting intensity of solar radiation which enters a vehicle compartment and a direction of entry thereof, and a vehicle air conditioner using the same. More particularly, the present invention relates to improvement in precision of a detected value for an amount of solar radiation in the vehicle solar radiation detection unit.

BACKGROUND OF THE INVENTION

Conventionally, a solar radiation detection unit for a vehicle and a vehicle air conditioner using the same have been disclosed in, for example, JP-A-2000-62433. In this official gazette, on the basis of an amount of solar radiation detected by a solar radiation sensor located on an instrument panel, through the use of a position of the vehicle, the solar position, obstacles, meteorological information, and the like that have been obtained by a navigation system, presence or absence and direction of entry of solar radiation entering the vehicle are computed to correct the solar radiation amount detected by the solar radiation sensor, thereby an amount of solar radiation to each seat area within the vehicle compartment is detected.

The solar radiation detection unit, however, is remained at correction of the solar radiation amount based on presence or absence and direction of entry of solar radiation entering the vehicle, and any influence on the solar radiation amount to which the vehicle is actually received is not been sufficiently studied by taking into consideration the vehicle-side condition, inclination state of the road, and the like. Accordingly, the solar radiation amount cannot be detected with high accuracy.

SUMMARY OF THE INVENTION

In view of the above-described points, it is one object of the present invention to provide a solar radiation detection unit for a vehicle capable of detecting an amount of solar radiation more precisely.

It is another object of the present invention to provide a vehicle air conditioner using a solar radiation detection unit, capable of performing more comfortable air-conditioning operation for passengers of the vehicle.

A solar radiation detection unit for detecting intensity of the solar radiation entering a vehicle compartment according to the present invention is provided in a vehicle equipped with a navigation system which detects the present position and a travel direction of the vehicle, and guides the travelling of the vehicle based on the detected present position and the detected the travel direction of the vehicle, and road information including at least information concerning structures around the road previously stored. According to the inventor's study, in the solar radiation amount entering the vehicle, by calculating a direction of entry of solar radiation entering the vehicle relative to the solar position and the travel direction of the vehicle, heat-receiving amount entering into the vehicle is determined. This entering direction of the solar radiation has a solar radiation attack angle ($\theta$) and a solar radiation lateral angle ($\phi$) with respect to the solar position and the travel direction of the vehicle. A quantity of heat received by the passenger by solar radiation and a quantity of heat received by the interior of the vehicle compartment by solar radiation are different based on the solar radiation attack angle ($\theta$). Incidentally, the quantity of heat received by the passenger seated on the seat becomes maximum when the solar radiation tack angle ($\theta$) is close to about 30° C., and the quantity of heat received by the interior of the vehicle compartment becomes maximum when the solar radiation attack angle ($\theta$) is close to about 60° C. Accordingly, by accurately detecting the solar radiation attack angle ($\theta$) entering the vehicle, the solar radiation amount entering the vehicle can be detected more accurately.

According to the present invention, the solar radiation detection unit has solar-radiation direction calculating means for calculating the direction of entry of solar radiation and solar-radiation amount calculating means for determining the solar radiation amount entering the vehicle. The solar-radiation amount calculating means corrects the solar radiation amount on the basis of the information unique to the vehicle, so that the solar radiation direction entering into the vehicle is determined on the basis of the solar position information and the road information. The solar-radiation amount calculating means is capable of detecting a more accurate amount of solar radiation by correcting the solar radiation amount entering the vehicle specifically on the basis of, as the information unique to the vehicle, the vehicle height, color of the vehicle body, position of the seat of the vehicle, positional relationship between the seat and position, size, angle and permeability characteristic of the widow glass in the vehicle.

In a vehicle traveling on a road, the vehicle horizontal direction varies depending upon the angle of inclination of the road. According to the present invention, solar-radiation direction calculating means for calculating the solar radiation direction entering the vehicle reads solar position information and road information concerning the vicinity of the vehicle position including at least information on the angle of inclination of the road to determine the solar radiation amount on the basis of the solar position information and the road information, whereby the solar radiation attack angle ($\theta$) is determined accurately, and a more accurate amount of solar radiation is detected. In the present invention, when it is determined that the solar radiation attack angle ($\theta$) is within a predetermined range, correction is made such that the solar radiation amount is made larger, whereby the quantity of heat received by the passenger by solar radiation is corrected to thereby enable comfortable air conditioning operation.

The solar radiation sensor for outputting a detection signal responsive to intensity of solar radiation is constructed of, for example, a well-known photodiode. Since the photodiode has generally low sensitivity characteristic within a visible light area (from 400 nm to about 800 nm) of wave length of sunlight, generally the output characteristic becomes maximum when the solar radiation attack angle ($\theta$) entering the vehicle is close to 90°, and as the solar radiation attack angle ($\theta$) becomes smaller than 90°. Further, the output characteristic is more decreased.

According to the present invention, on the basis of the calculation result of the solar-radiation direction calculating means, the solar radiation amount is determined by correcting a detected value from the solar radiation sensor. Accordingly, the solar-radiation amount calculating means is capable of determining an amount of solar radiation consistent with the quantity of heat received by the passenger and the vehicle. Thus, a more accurate amount of solar radiation is detected. As regards a corrected value corresponding to the quantity of heat received by solar radiation, specifically, the correction is made such that it becomes maximum in a range of 0° and 75° in which the output characteristic of the solar radiation sensor is decreased. Therefore, it becomes possible to detect a high precision amount of solar radiation corresponding to the heat-receiving amount received by the passenger and the vehicle.

Since the heat-receiving amount of the vehicle is affected by the characteristic of the window glass, the corrected value is further corrected in accordance with, for example, type of the window glass of the vehicle, so that the solar radiation entering the vehicle is detected with higher precision.

In order to determine the solar radiation direction ($\theta$, $\phi$), information unique to the vehicle including at least the shape of the vehicle in addition to the angle of inclination of the road is inputted into the navigation system in advance, the solar radiation direction ($\theta$, $\phi$) entering the vehicle is accurately determined in accordance with the information unique to the vehicle, and an increment of the quantity of received heat entering the vehicle is obtained accurately and the detection precision is further improved.

In addition to the present position and the travel direction of the vehicle, meteorological information means corresponding to the area is inputted into the navigation system, so that weather information such as, for example, intensity of solar radiation, an amount of clouds, and rainy weather is used among the meteorological information for further improving the detection precision of solar radiation.

In the present invention, there is provided solar-radiation amount correction and storage means which stores a correction coefficient corresponding to the solar radiation direction ($\theta$, $\phi$) in order to determine the solar radiation amount entering the vehicle correspondingly to a direct-reaching amount of solar radiation for reaching the earth's surface that has been determined from the solar position, and the correction coefficient is determined from the solar-radiation amount correction and storage means on the basis of the solar radiation direction ($\theta$, $\phi$) determined by the solar-radiation direction calculating means. Solar-radiation amount calculating means is provided for determining the solar radiation amount entering the vehicle through the use of the correction coefficient and the direct-reaching amount of solar radiation, so that the solar radiation amount corresponding to the solar radiation direction ($\theta$, $\phi$) entering the vehicle is detected. Accordingly, a high precision amount of solar radiation corresponding to the quantity of heat received by the passenger and the vehicle is detected. The solar position determined by solar position retrieval means, road information including positions and height information of roads around the vehicle and structures around the roads which have been detected by the navigation system, and information unique to the vehicle by vehicle information input means having information unique to the vehicle including at least the shape of the vehicle are read. Further, the solar-radiation direction calculating means which determines the solar radiation direction ($\theta$, $\phi$) entering the vehicle on the basis of the solar position, road information and information unique to the vehicle is provided. Since the solar radiation attack angle ($\theta$) entering the vehicle differs with, for example, the shape of the vehicle, the angle of inclination of the road and the like, the solar radiation attack angle ($\theta$) is determined accurately by inputting these information. Thus, a higher precision amount of solar radiation is detected as compared with the solar radiation amount detected only by the solar radiation sensor.

In an air conditioner for a vehicle using this solar radiation detection unit, control means is provided. When solar radiation from the solar position enters the vehicle, the control means performs a flow amount control of conditioned air to be blown into respective air outlet for plural areas within the vehicle compartment, on the basis of the solar radiation amount determined by the solar-radiation amount calculating means. Accordingly, it is possible to perform blowing control of the conditioned air in accordance with the solar radiation amount entering the vehicle to thereby improve the comfort of the passengers within the vehicle compartment.

BRIEF DESCRIPTION OF THE DRAWINGS

FIG. 8A is an explanatory view showing the position of the solar radiation lateral angle ($\phi$) entering the vehicle, and FIGS. 8B to 8I are characteristic views representing air flow distribution for each seat at a position of the solar radiation lateral angle ($\phi$);

FIG. 12A is a solar-radiation amount retrieval map showing a relationship between a direct-reaching solar radiation amount of solar-radiation amount storage means and the date and time; and FIG. 12B is a retrieval map for a solar-radiation amount correction coefficient, showing a relationship between the solar radiation direction ($\theta$, $\phi$) of the solar-radiation amount correction and storage means and the correction coefficient;

DETAILED DESCRIPTION OF THE PREFERRED EMBODIMENTS

Next, with reference to the drawings, embodiments of the present invention will be now described.
(First Embodiment)

Figure 1:
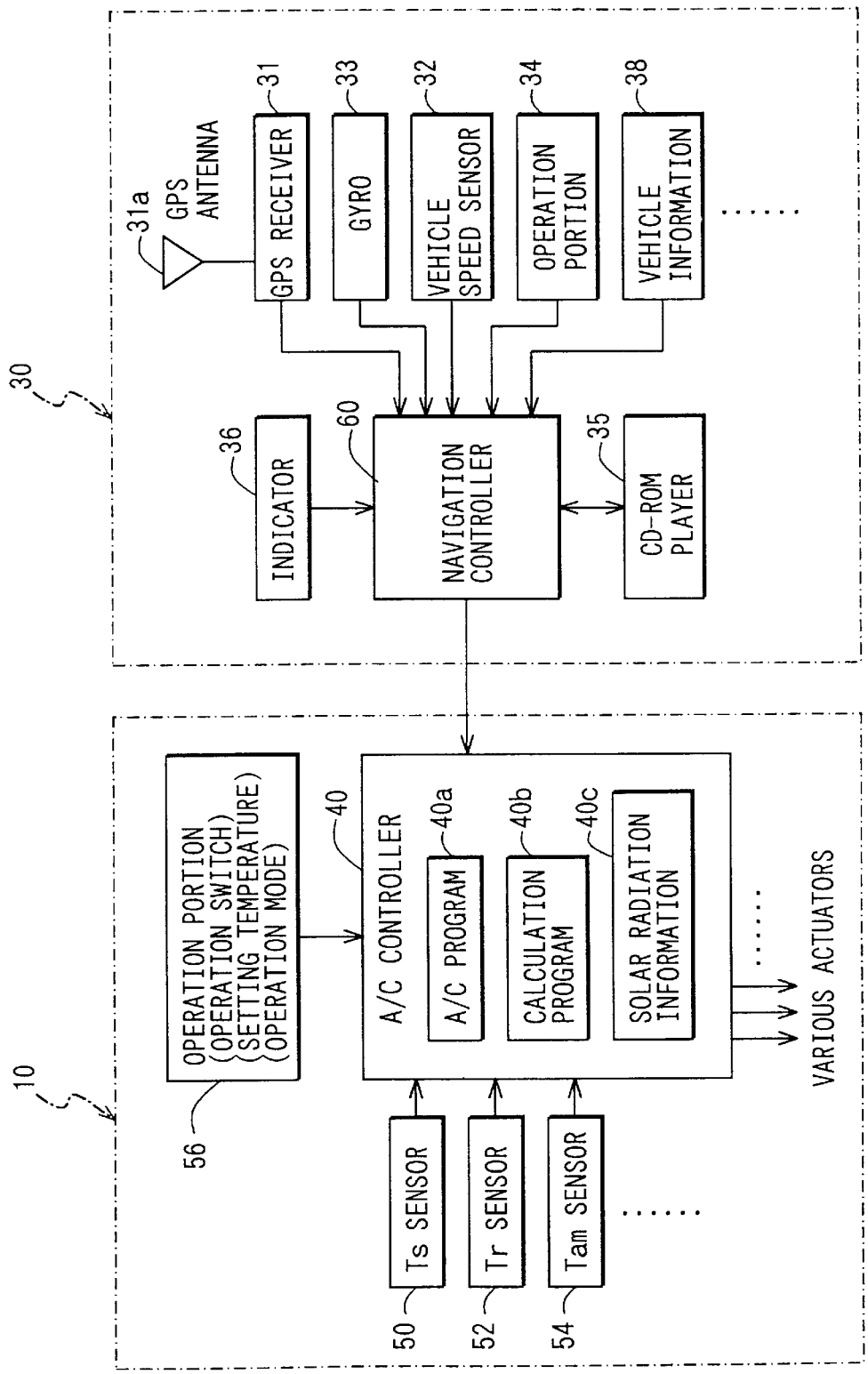
FIG. 1 is a block diagram showing an air conditioning system and a navigation system of an air conditioner for a vehicle according to a first embodiment of the present invention.

The first embodiment of the present invention will be described with reference to FIGS. 1 to 9. In the first embodiment, a solar radiation detection unit for a vehicle according to the present invention is typically used for a vehicle air conditioner. As shown in FIG. 1, the vehicle air conditioner has an air conditioning system 10 and a navigation system 30.

Figure 4:
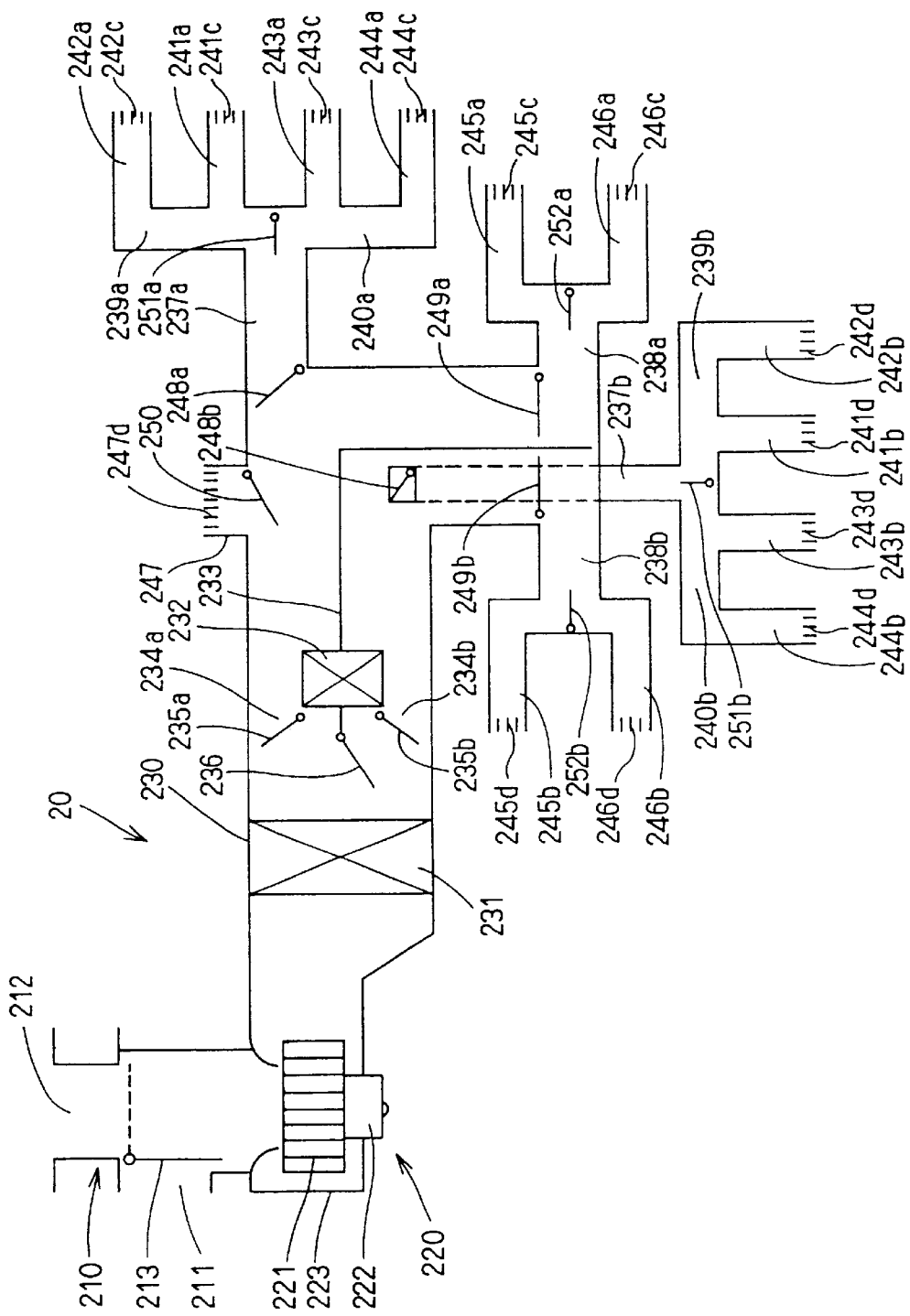
FIG. 4 is a schematic view showing an overall structure of an air conditioning unit 20 according to the first embodiment.

As shown in FIG. 4, an air conditioning unit 20 according to the present first embodiment is of a front-rear and left-right independent temperature-control type. For example, the interior of the vehicle compartment is mainly partitioned into four areas, and each of them is performed to be air-conditioned independently by the air-conditioning unit 20. Hereinafter, the air conditioning unit 20 will be explained with the front-rear and left-right independent temperature control type as an example. However, the present invention is not limited to the front-rear and left-right independent temperature control type, but is also applicable to a left-right independent temperature control type and a front-rear independent temperature control type.

The air conditioning unit 20 is exclusively disposed below the instrument panel within the vehicle compartment. In a region of the air conditioning unit 20 on the air upstream side, there is provided an inside/outside air switching box 210. In the inside/outside air switching box 210, an inside air suction port 211 and an outside air suction port 212 are formed. Further, in a portion where the inside air suction port 211 and the outside air suction port 212 are separated, there is provided an inside/outside air switching door 213 for selectively opening or closing each suction port. This inside/outside air switching door 213 is coupled to a servo motor (not shown) as driving means.

At the air outlet of the inside/outside air switching box 210, a centrifugal motor-operated blower 220 as air-blowing means is provided. This blower 220 is composed of a centrifugal fan 221, a blower motor 222 for driving it, and a scroll casing 223 for housing the centrifugal fan 221.

Blower voltage to be applied to the blower motor 222 is controlled by a blower motor controller (not shown) which is used as driving means.

An air conditioning case 230 of the air conditioning unit 20 is connected to an air outlet side portion of the scroll casing 223. Within this air conditioning case 230, there are disposed an evaporator 231 which serves as air cooling means, and a heater core 232 as air heating means. The heater core 232 is disposed at the air downstream side of the evaporator 231. Within the air conditioning case 230, on the air upstream and downstream sides of the heater core 232, partition plates 233 are disposed. Within the air conditioning case 230, on bode sides (upper and lower sides of FIG. 4) of the heater core 232, there are provided first and second bypass passages 234a, 234b through which cool air that has been cooled by the evaporator 231 bypasses the heater core 232.

On the air upstream side of the heater core 232, first and second air mix doors 235a, 235b are disposed in the air-conditioning case 230. To these doors 235a, 235b, there are respectively coupled first and second servo motors (not shown) as driving means. This servo motor incorporates a potentiometer (not shown) which detects the angle of rotation of the output shaft of the motor to thereby detect the actual position of the air mix door 235a, 235b.

Thus, a ratio between an air amount passing through the heater core 232 above the partition plate 233 in FIG. 4 and an air amount passing through the first bypass passage 234a is adjusted by an opening degree of the first air mix door 235a. Further, a ratio between an air amount passing through the heater core 232 below the partition plate 233 in FIG. 4 and an air amount passing through the second bypass passage 234b is adjusted by an opening degree of the second air mix door 235b. In other words, the first air mix door 235a is an air mix door which controls temperature of conditioned air to be blown toward the front seat side of the vehicle compartment, while the second air mix door 235b is an air mix door which controls temperature of conditioned air to be blown toward the rear seat side of the vehicle compartment.

The evaporator 231 is a heat exchanger constituting a refrigerating cycle, which is coupled to and combined together with a compressor (not shown), a condenser, a receiver and a pressure reducing unit. The evaporator 231 dehumidifies and cools the air within the air conditioning case 230. The compressor is coupled to an automotive engine through an electromagnetic clutch (not shown), and this electromagnetic clutch is intermittently controlled to thereby perform drive-stop control.

The heater core 232 is a heat exchanger in which cooling water of the automotive engine is used as a heat source, and heats again the cool air cooled by the evaporator 231. An adjusting door 236 provided at the upstream end of the partition plate 233 is a door which regulates an air distribution ratio of conditioned air to be blown to the front seat side and the rear seat side. To this front-rear air distribution adjusting door 236, a servo motor (not shown) as driving means is coupled. When this front-rear air distribution adjusting door 236 is rotated, for example, downward in FIG. 4, the flow amount of conditioned air to be blown toward the front seat side is relatively increased to the rear seat side.

Next, on the air outlet side of the air conditioning case 230, a front seat face duct 237a and a front seat foot duct 238a are provided to be connected thereto, so that conditioned air, whose temperature has been adjusted by the opening degree of the first air mix door 235a, is blown to the front seat face side through the front seat face duct 237a and to the front seat foot side through the front seat foot duct 238a. Further, a rear seat face duct 237b and a rear seat foot duct 238b are connected to the air outlet side of the air conditioning case 230, so that conditioned air, whose temperature has been adjusted by the opening degree of the second air mix door 235b, is blown to the rear seat face side through the rear seat face duct 237b and to the rear seat foot side through the rear seat foot duct 238b.

At a downstream side of the front seat face duct 237a, a front seat left face duct 239a and a front seat right face duct 240a are branch, and at their respective downstream ends, there are formed a front-seat left-center face duct 241a, a front-seat left-side face duct 242a, a front-seat right-center face duct 243a, and a front-seat right-side face duct 244a. At a downstream side of the rear seat face duct 237b, a rear seat left face duct 239b and a rear seat right face duct 240b are branched, and at their respective downstream ends, there are formed a rear-seat left-center face duct 241b, a rear-seat left-side face duct 242b, a rear-seat right-center face duct 243b, and a rear-seat right-side face duct 244b.

At the downstream end of the front seat foot duct 238a, a front seat left foot duct 245a and a front seat right foot duct 246a are formed. At the downstream end of the rear seat foot duct 238b, a rear seat left foot duct 245b and a rear seat right foot duct 246b are formed.

At the downstream end portions of these ducts 241a, 242a, there are formed a center face air outlet port 241c and a side face air outlet port 242c from which conditioned air is blown toward the upper half part of the body of the passenger on the left side of the front seat. Further, at the downstream end portions of those ducts 243a, 244a, there are formed a center face air outlet port 243c and a side face air outlet port 244c from which conditioned air is blown toward the upper half part of the body of the passenger on the right side of the front seat.

At the downstream end portions of the ducts 241b, 242b on the rear seat side, there are formed a center face air outlet port 241d and a side face air outlet port 242d from which conditioned air is blown to the upper half part of the body of the passenger on the left side of the rear seat. Further, at the end portions of those ducts 243b, 244b, there are formed a center face air outlet port 243d and a side face air outlet port 244d from which conditioned air is blown to the upper half part of the body of the passenger on the right side of the rear seat.

Further, at the downstream end portions of the front seat left foot duct 245a and the front seat right foot duct 246a, there are formed foot air outlet ports 245c, 246c from which conditioned air is blown to the foot area of the front seat passenger. At the downstream end portions of the rear seat left foot duct 245b and the rear seat right foot duct 246b, there are formed foot air outlet ports 245d, 246d from which conditioned air is blown to the foot area of the rear seat passenger.

To one end of the air conditioning case 230 on the air outlet side, a defroster duct 247 is connected. At the downstream end portion of the defroster duct 247, there is formed a defroster air outlet port 247d from which conditioned air is blown toward the inner surface of the front glass.

In the regions on the air inlet sides of the front seat face duct 237a, the rear seat face duct 237b, the front seat foot duct 238a, the rear seat foot duct 238b and the defroster duct 247, there are provided, respectively, a front seat face door 248a, a rear seat face door 248b, a front seat foot door 249a, a rear seat foot door 249b and a defroster door 250 which open and close the respective ducts.

At the branching portion between the front seat left face duct 239a and the front seat right face duct 240a on the downstream of the front seat face duct 237a, there is provided a front-seat lateral air-distribution adjusting door 251a which adjusts the air distribution ratio of conditioned air to be introduced into the front seat left face duct 239a and the front seat right face duct 240a. Similarly, at the branching portion between the rear seat left face duct 239b and the rear seat right face duct 240b on the downstream of the rear seat face duct 237b, there is provided a rear-seat lateral air-distribution adjusting door 251b which adjusts the flow distribution ratio of conditioned air to be introduced into the rear seat left face duct 239b and the rear seat right face duct 240b.

Similarly, at the branching portion between the front seat left foot duct 245a and the front seat right foot duct 246a on downstream of the front seat foot duct 238a, there is provided a front-seat lateral air distribution adjusting door 252a which adjusts the flow distribution ratio of conditioned air to be introduced into the front seat left foot duct 245a and the front seat right foot duct 246a. At the branching portion between the rear seat left foot duct 245b and the rear seat right foot duct 246b on downstream of the rear seat foot duct 238b, there is provided a rear-seat lateral air-distribution adjusting door 252b which adjusts the flow distribution ratio of conditioned air to be introduced into the rear seat left foot duct 245b and the rear seat right foot duct 246b.

A servo motor (not shown) as driving means is coupled to the front seat face door 248a and the front seat foot door 249a, the rear seat face door 248b and the rear seat foot door 249b, respectively. To the defroster door 250, the front-seat lateral air-distribution adjusting door 251a, 252a, and a rear-seat lateral air-distribution adjusting door 251b, 252b, there is coupled a servo motor (not shown) as driving means for each of the respective doors.

In this respect, among the doors, rotation positions of the front-rear air-distribution adjusting door 236, the front-seat lateral air-distribution adjusting door 251a, 252a and the rear-seat lateral air-distribution adjusting door 251b, 252b are controlled, so that it is possible to adjust the flow distribution ratio of conditioned air to be blown toward four longitudinal and lateral passenger seats of the vehicle for independently controlling the air flow.

The longitudinal and lateral independent temperature-control type air conditioner according to the present first embodiment has an air conditioning system 10 and a navigation system 30. The air conditioning system 10 has, in addition to the air conditioning unit 20, an air conditioning controller 40 which is controlling means for controlling this air conditioning unit 20. The navigation system 30 is provided in order to output various control signals to this air conditioning controller 40.

FIG. 1 is a block diagram showing structure of the air conditioning system 10 and the navigation system 30. The air conditioning controller 40 of the air conditioning system 10 is, as shown in FIG. 1, constructed so as to input control signals from various sensors within the air conditioning system 10, an operating unit 56 and the navigation system 30 mounted on the vehicle respectively. The air conditioning controller 40 of the air conditioning system 10 outputs control signals to the blower motor controller, the potentiometer and various actuators such as the servo motors within the air conditioning unit 20, to control the air flow amount.

These various sensors are environmental condition detection means for detecting environmental conditions that affect the air conditioning state within the vehicle compartment. For example, a solar radiation sensor 50 for detecting the solar radiation amount receiving from the sun as intensity of the solar radiation, an inside air temperature sensor 52 for detecting the temperature within the vehicle compartment, and an outside air temperature sensor 54 for detecting air temperature outside the vehicle are typical sensors. Each of these sensors is electrically connected to the air conditioning controller 40.

Figure 2A:
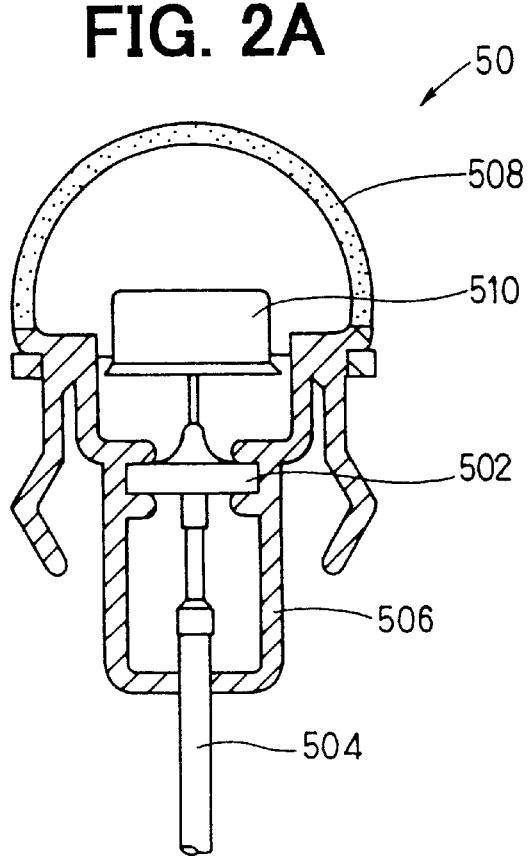
FIG. 2A is a substantially cross-sectional view showing structure of a solar radiation sensor according to the first embodiment.
Figure 5A:
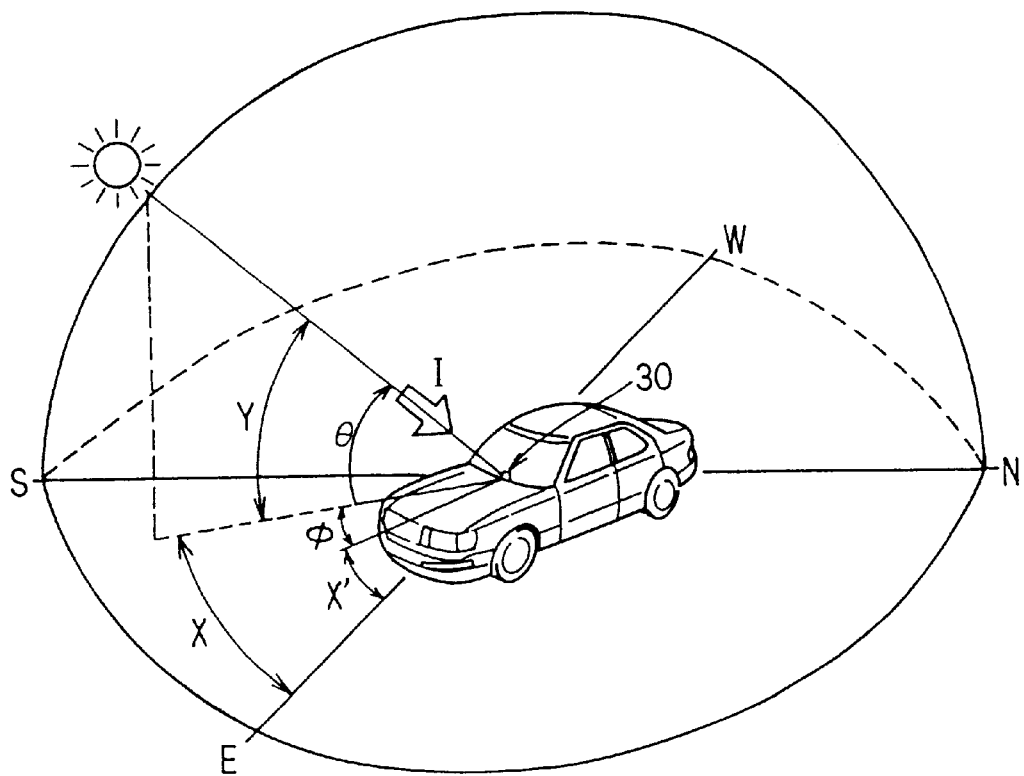
FIG. 5A is an explanatory view showing a relationship between positional information (X, Y) representing the solar position and the solar radiation direction ($\theta$, $\phi$)

The solar radiation sensor 50 will be described. The solar radiation sensor 50 is covered with a filter which filters out any other unnecessary light except for the sunlight for the photodiode. The solar radiation sensor 50 is disposed on the instrument panel in the front part of the vehicle compartment to detect the intensity of solar radiation of the sun light that permeates the front glass. As shown in FIG. 2A, in the solar radiation sensor 50, a substrate 502, to which a photodiode 510 as a photoelectric conversion element is installed, is fixed within a cylindrical-shaped holder 506 in which a light receiving surface side of the photodiode 510 is opened. Further, on the aperture side of this holder 506, there is provided a filter 508 which protects the photodiode 510 and filters out any other unnecessary light except for the sun light. As shown in FIG. 5A, this solar radiation sensor 50 is installed at a front position within the vehicle compartment, and receives the sunlight permeating the front glass to generate a detection signal responsive to the solar radiation amount (in other words, intensity of solar radiation) I, for example.

The holder 506 is constructed so as to be divided into left and right parts along the axial direction thereof. Portions of the holder 506 divided into left and right parts are fitted to each other, so that the substrate 502 is fixed within the holder 506. As shown in FIG. 2A, at a side opposite to the aperture of the holder 596, a hole, through which a signal line 504 drawn out of the back surface of the substrate 502 is inserted, is provided, and a detection signal from the photodiode 510 is inputted into the air conditioning controller 40 through the signal line 504 inserted into this hole.

Figure 2B:
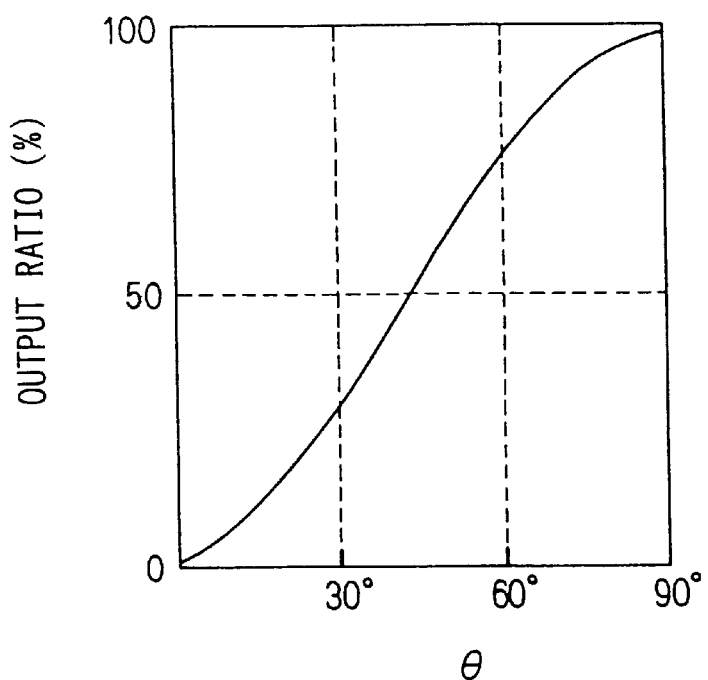
FIG. 2B is a graph showing a relationship between a solar radiation attack angle ($\theta$) of the solar radiation sensor and an output ratio.

In this solar radiation sensor 50, the photodiode 510 has low sensitivity characteristic within a visible optical area (from about 400 nm to about 800 nm) of wave length of the sunlight. Therefore, as shown in FIG. 2B, the output characteristic generally becomes maximum when the solar radiation attack angle entering the vehicle is near 900. Further, as the solar radiation attack angle becomes smaller than 90°, the output characteristic is more decreased.

The operating unit 56 is an operation panel for the passenger to instruct an operation mode, setting temperature and the like, and has various operating means. Hear, in the operation mode, a selection switch (not shown) is provided for selecting an operation condition for controlling air-conditioning operation such as air flow amount and air temperature for each seat. In other words, a number of passengers (number of seats) is set, so that either a three-seat independent temperature control operation for independently controlling a triple zone consisting of left and right seats on the front side and one rear seat or a four-seat independent temperature control operation for independently controlling a tetra zone consisting of left and right seats each on the front and rear sides is set to be selected. Further, a rear cooler operating switch (not shown), for performing air conditioning operation for the rear seat side of the vehicle is provided.

Next, the navigation system 30 for outputting control signals for various information to the air conditioning controller 40 is provided with: a GPS antenna 31a for receiving transmission radio waves from an artificial satellite for GPS (Global Positioning System); a GPS receiver 31 for calculating the vehicle present position, the travel direction of the vehicle and the like on the basis of a receiving signal from the GPS antenna 31a; a vehicle speed sensor 32 for detecting the running speed of the vehicle; a gyro 33 for detecting a change in the travel direction of the vehicle; an operating portion 34 for the vehicle passenger to input various commands; a player 35 for reading out road information from a DVD or CD-ROM in which road information representing road maps, angles of inclination of roads, and position and height information of buildings around the roads are stored; an indicator 36 consisting of CRT, liquid crystal display, and the like for displaying road maps, the present vehicle position, the travel direction of the vehicle; and a navigation controller 60 and the like. The navigation controller 60 reads signals of information from each of the above-described portions, displays mainly the vehicle present position, the travel direction of the vehicle, target and destination and the like of the vehicle together with the road maps on the indicator 36, and guides the driver in traveling of the vehicle.

In the present first embodiment, as information unique to the vehicle for calculating the solar radiation direction entering the vehicle in addition to the described information, vehicle information input means 38 is provided for inputting, into the navigation controller 60, information such as at least the shape of the vehicle, the height position of the window glass, the specification of the window glass, and height dimension of the passenger seats.

For example, if a vehicle distributor inputs the shape and the like of the vehicle into the navigation controller 60 for storage in advance when mounting the navigation system 30 onto the vehicle, it is unnecessary to set the vehicle information by the passenger in the vehicle information means 38. Here, the information unique to the vehicle is inputted into the navigation controller 60, but it may be directly inputted into the air conditioning controller 40.

Further, relative to the present vehicle position and the travel direction of the vehicle, the player 35 according to the embodiment is capable of reading out road information containing at least a road and positions and heights of structures around the road, topographic information of the road and the vicinity thereof, information of the road, structures and the like in the vicinity thereof. In roads in, for example, a built-up area and the like, the player 35 contains information including heights and the like of a road and structures around the road which block off solar radiation from the solar position in the travel direction of the vehicle, such as: heights of structures such as buildings around the road; heights and sizes of sound arresting walls and the like built on road shoulders; road construction information concerning elevated constructions, tunnels and underpasses; and topographic information concerning mountains and valleys.

The player 35 is used as road information input means which determines whether or not there exists any shelter against solar radiation entering the vehicle to be described later in the travel direction of the vehicle. In this respect, these road information is detected from the DVD or CD-ROM, but it may be inputted into the navigation controller 60 through general information communication network such as Internet, transport facilities communication network or the like.

In the navigation system 30, the GPS receiver 31 is used for the so-called GPS navigation which measures the present position and the travel direction of the vehicle on the basis of a radio wave from an artificial satellite. The vehicle speed sensor 32 and the gyro 33 are used to perform the so-called self-contained navigation that measures the present position, the travel direction and the like of the vehicle while renewing the present position and the travel direction of the vehicle one after another by detecting a relative amount of movement of the vehicle. When the measurement result using the GPS receiver 31 is not normal such as in a case where the vehicle is traveling within a tunnel in which the vehicle cannot receive any radio wave from the artificial satellite, the vehicle speed sensor 32 and the gyro 33 are used in order to complement the present position and the travel direction of the vehicle.

The air conditioning controller 40 and the navigation controller 60 have therein an AD converter, a microcomputer and the like which are not shown, respectively. Therefore, in the air conditioning controller 40 and the navigation controller 60, signals from various sensors and each potentiometer are inputted into the microcomputer after AD converted by the AD converter. The microcomputer is a well-known one having CPU, ROM, RAM, a stand-by RAM, an I/O port and the like (not shown). When the ignition switch of the engine is turned ON, power is supplied to the microcomputer from a battery (not shown). Thus, each of these controllers 40, 60 has a communication function and can be used to transmit and receive information through a communication line.

In this respect, the air conditioning controller 40 has, within the ROM (not shown), an air conditioning program 40a for controlling air conditioning operation, a calculation program 40b for calculating a solar radiation direction, and storage means 40c in which solar position information (solar radiation information) representing the solar position necessary when the solar radiation direction is calculated, and the like are stored.

Figure 3:
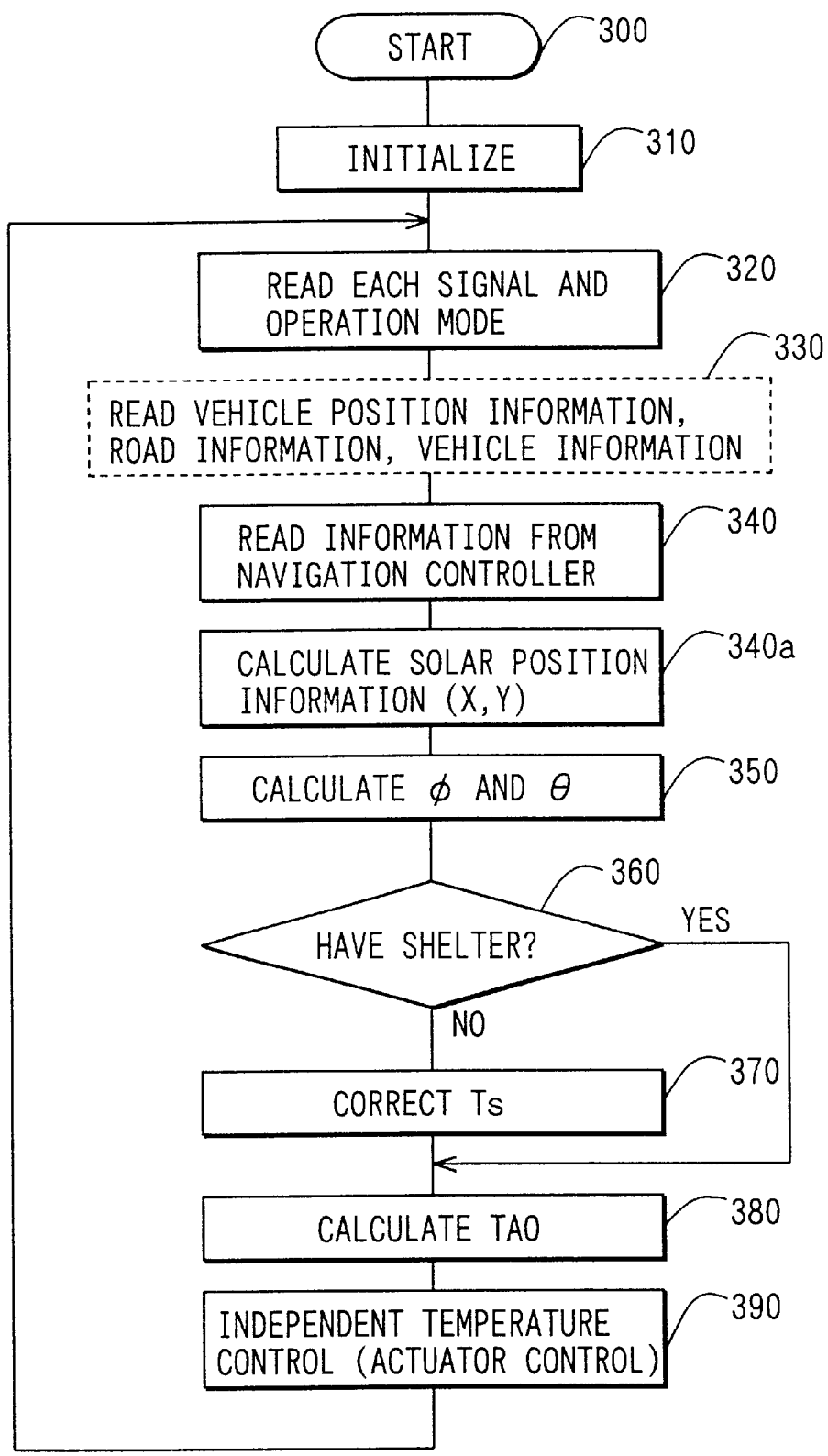
FIG. 3 is a flow chart showing a control process of an air conditioning controller 40 according to the first embodiment.

When the ignition switch is turned ON and power is supplied to each controller 40, 60, the control operation shown in FIG. 3 according to the first embodiment is started. The air conditioning controller 40 inputs various information and input signals from various sensors to perform the control operation according to the first embodiment on the basis of the control process of a series of air conditioning program 40a for drivingly and controlling various actuators.

Specifically, when an air conditioning operating switch (not shown) is first actuated at step 300 of FIG. 3, the contents and the like of storage of a data processing memory (RAM) will be initialized at step 310.

Next, at step 320, each signal of environment conditions such as an amount of solar radiation Ts detected by the solar radiation sensor 50, the inside air temperature Tr detected by the inside air temperature sensor 52, the outside air temperature Tam detected by the outside air temperature sensor 54, and the set temperature Tset set by the passenger. Further, among the operation mode, the number of the passengers and an operating state of the rear cooler is inputted. Here, the four-seat independent temperature control in which the number of passengers being four persons is inputted, and the operation mode with stoppage of the rear cooler will be now described. In this respect, the signal of the solar radiation sensor 50 is AD converted, and the AD converted value is read as intensity of solar radiation I.

At step 330, the control process of the navigation controller 60 is indicated. Here, through the use of the gyro 33, the vehicle speed sensor 32 and the GPS antenna 31a, the air-conditioning controller reads vehicle position information having the present position and the travel direction X' of the vehicle computed by the GPS receiver 31, road information including road construction and topography such as structures around the road and inclination angles Y' of the road concerning the present position and the travel direction X' of the vehicle that have been read from the player 35, and information unique to the vehicle such as the vehicle shape and glass specification that have been inputted by the vehicle information input means 38. At step 340, the air conditioning controller 40 reads, from the navigation controller 60, the present date and time (the date and hour), the vehicle position information, the information around the road, and information unique to the vehicle.

At step 340a which is solar position retrieval means, on the basis of the present date and hour that have been read at step 340, positional information (X, Y) representing the solar position that changes in accordance with the date and time is calculated from the solar position retrieval map which is solar position storage means in the storage means 40c, stored in advance in the ROM within the air conditioning controller 40.

This solar position retrieval map is solar position information indicating the solar position necessary when the direction (θ, φ) of solar radiation entering the vehicle to be described later is computed. The solar position changes in accordance with the date and time. Therefore, with the data and time as a variable respectively, the solar position is set as positional information (X, Y) for each date and time, as shown in FIG. 5A by defining compass bearing data X indicating a rotation angle of the sun rotated in the right direction with respect to the due east E, and attack angle data Y for indicating solar radiation attack angle. In this case, the solar positional information (X, Y) corresponding to the present date and time is determined from the solar position retrieval map. Hear, this positional information (X, Y) may be determined by an calculation using latitude, declination and hour angle.

Figure 5B:
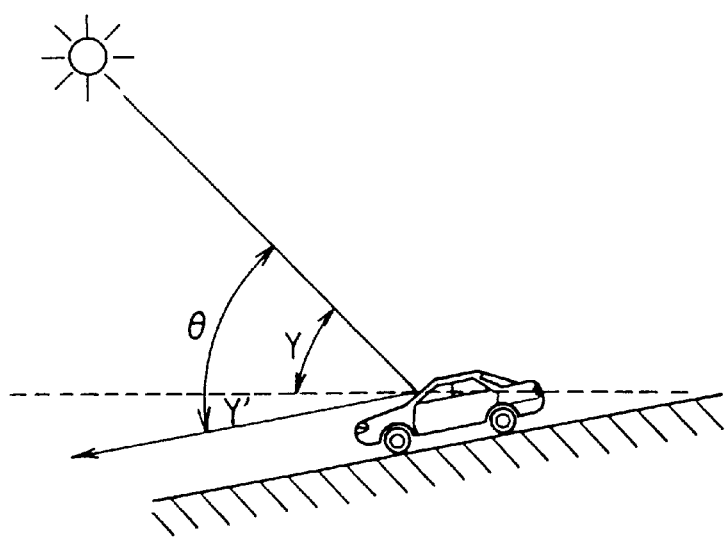
FIG. 5B is an explanatory view showing a relationship between an angle of inclination (Y') of the vehicle and the solar radiation attack angle ($\theta$)

At step 350 which is the solar-radiation direction calculating means, the solar radiation direction (θ, φ) entering the vehicle is computed on the basis of the positional information (X, Y) of step 340a, the travel direction X' of the vehicle which has been read from the navigation controller 60 at step 340, and information of the inclination angle Y' of the road and unique to the vehicle. Among the solar radiation direction (θ, φ) the solar radiation attack angle (θ) entering the vehicle side differs, as shown in FIG. 5B, with the inclination angle Y' of the road and the vehicle shape information such as the vehicle height, the height position and the size of the front glass and side glass, the height of the passenger seat. Accordingly, in the embodiment, in order to accurately determine the solar radiation direction (θ, φ) entering the vehicle, the following correction is performed to compute the solar radiation attack angle (θ) entering the vehicle.

In other words, firstly, when the navigation system 30 is mounted onto the vehicle as described above, the information unique to the vehicle representing the vehicle shape such as the position and size of the window glass of the vehicle is inputted in advance in the vehicle information input means 38 for inputting into the navigation controller 60. Secondly, from the road information representing slope information in which the inclination angle Y' of the road is found out, in the road information input means, the present position of the vehicle and the inclination angle of the vehicle in the travel direction are detected in advance. In addition, in accordance with the detected vehicle shape, the inclination angle Y' and the like, the solar radiation attack angle (θ) entering the vehicle is determined.

As regards the other compass bearing data X, on the basis of the travel direction X' of the vehicle which has been read from the navigation controller 60, an incident angle (hereinafter, referred to as solar radiation lateral angle) φ of solar radiation to the vehicle in the lateral direction is computed using an calculation expression [φ=X−X']. Here, since this solar radiation lateral angle (φ) is not affected by the inclination angle Y' of the road, there is no need for correction in accordance with the road inclination. In FIG. 5A, E, W, S and N represent compass bearing of East, West, South and North with the vehicle being centered respectively. The travel direction X' of the vehicle indicates the rotation angle of the travel direction rotated to the right direction with respect to the due east E in the same manner as the compass bearing data X.

At step 360 which is shelter determining means, it is determined whether or not solar radiation from the sun entering from a direction with the solar radiation lateral angle ($\phi$) and the solar radiation attack angle ($\theta$) determined by the solar-radiation direction calculating means is shielded. In other words, at step 360, on the basis of the road information read at step 340, the existence of a road and structures around the road, for example, shelters such as high-rise buildings and mountains is confirmed to determine whether or not the solar radiation entering the vehicle is shielded.

In this case, in the determination of presence or absence of existence of any shelter, when "no shelter" and "shelter present" frequently appear, it is possible to input information from the vehicle speed sensor 32, to predict presence or absence of the shelter to the destination after traveling for a predetermined time, and to use the shelter determining means in which switching of "no shelter" has been roughly set.

If there is no shelter, it is determined to be "no shelter", and the solar radiation amount entering the vehicle is computed by the solar-radiation amount calculating means at step 370. In the embodiment, the intensity of solar radiation detected by the solar radiation sensor 50 is corrected by the entering direction ($\theta$, $\phi$) entering into the vehicle to determine the solar radiation amount Ts.

Figure 6A:
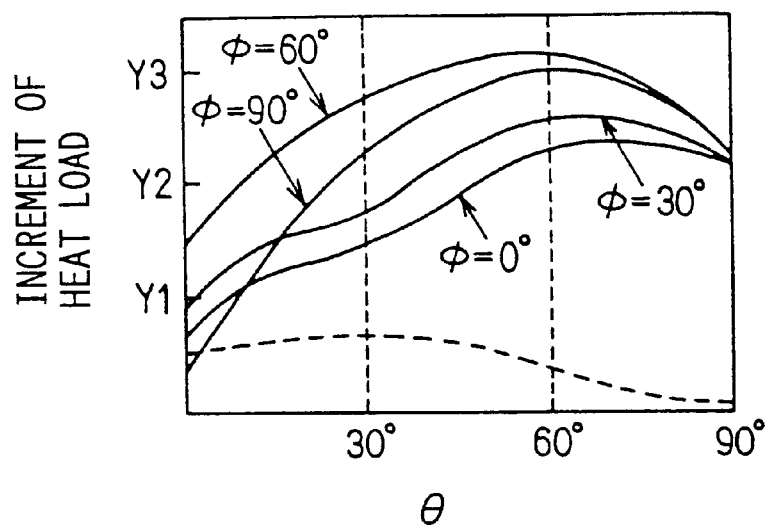
FIG. 6A is a characteristic view showing relationship between the solar radiation attack angle ($\theta$) and an increment of heat load received by the passengers and vehicle.

Since the correction of this solar radiation amount Ts is determined by experiment, it will be described hereinafter. First, as shown in FIG. 6A, it is determined how much the quantity of heat (increment of heat load) received by the passenger and the vehicle changes relative to the solar radiation attack angle ($\theta$) and the solar radiation lateral angle ($\phi$). That is, the characteristic graph indicated by the solid line shows a heat-receiving amount (increment of heat load) of the vehicle compartment corresponding to the solar radiation attack angle ($\theta$), and the characteristic indicated by broken line shows a heat-receiving amount (increment of heat load) received by the passenger. Hear, the heat-receiving amount of the passenger seated on the seat becomes maximum when the solar radiation attack angle ($\theta$) is close to about 30°, and the heat-receiving amount within the vehicle compartment becomes maximum when the solar radiation attack angle ($\theta$) is close to about 60°.

Since the heat-receiving amount of the passenger has generally the same tendency even if the solar radiation lateral angle ($\phi$) differs, the heat-receiving amount of the passenger at the solar radiation lateral angle ($\phi$)=60° is indicated here. Accordingly, the result of two special features in that the heat-receiving amount differs between the solar radiation attack angle ($\theta$) and the solar radiation lateral angle ($\phi$) is obtained.

Figure 6B:
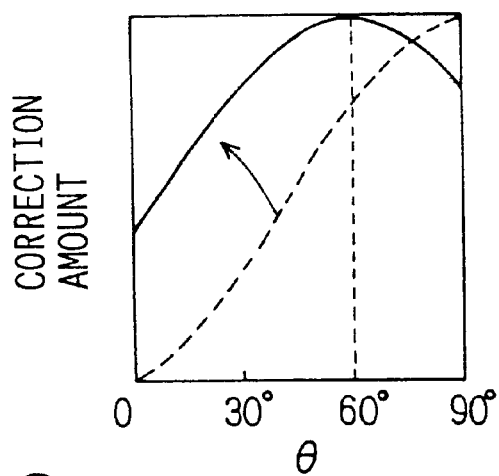
FIG. 6B is a characteristic view showing a relationship between the solar radiation attack angle ($\theta$) and a correction value of the solar radiation amount.
Figure 6C:
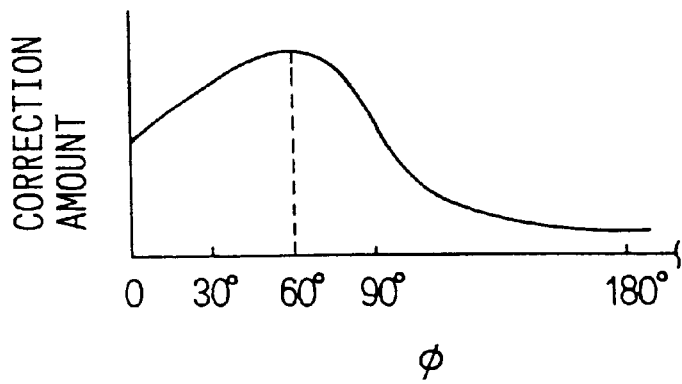
FIG. 6C is a characteristic view showing a relationship between a solar radiation lateral angle ($\phi$) and a correction value of the solar radiation amount.

In other words, the first special feature is that as indicated by solid line in FIG. 6B, the heat-receiving amount becomes maximum when the solar radiation attack angle ($\theta$) is about 60° irrespective of the solar radiation lateral angle ($\phi$). The second special feature is that as shown in FIG. 6C, the heat-receiving amount becomes maximum when the solar radiation lateral angle ($\phi$) is about 60° irrespective of the solar radiation attack angle ($\theta$).

Thus, the correction value of the solar radiation amount Ts relative to the solar radiation attack angle ($\theta$) is used to correct, as shown in FIG. 6B, the output characteristic of the solar radiation sensor 50 indicated by broken line to the output characteristic indicated by solid line. In this case, a correction characteristic of the solar radiation amount Ts, in which the correction value becomes maximum at the solar radiation attack angle ($\theta$) of at least 0° to 75° (with 60° as a peak) is obtained. Further, a correction characteristic of the solar radiation amount Ts, in which the correction value of the solar radiation lateral angle ($\phi$) becomes maximum at the solar radiation attack angle ($\theta$) of at least 0° to 75° (with 60° as a peak), is obtained in the same manner as the solar radiation attack angle ($\theta$) as shown in FIG. 6C. Accordingly, the solar radiation direction ($\phi$,$\theta$) is determined to correct the solar radiation amount Ts, so that it is possible to detect an increment of heat load corresponding to the heat-receiving amount due to solar radiation.

Figure 7A:
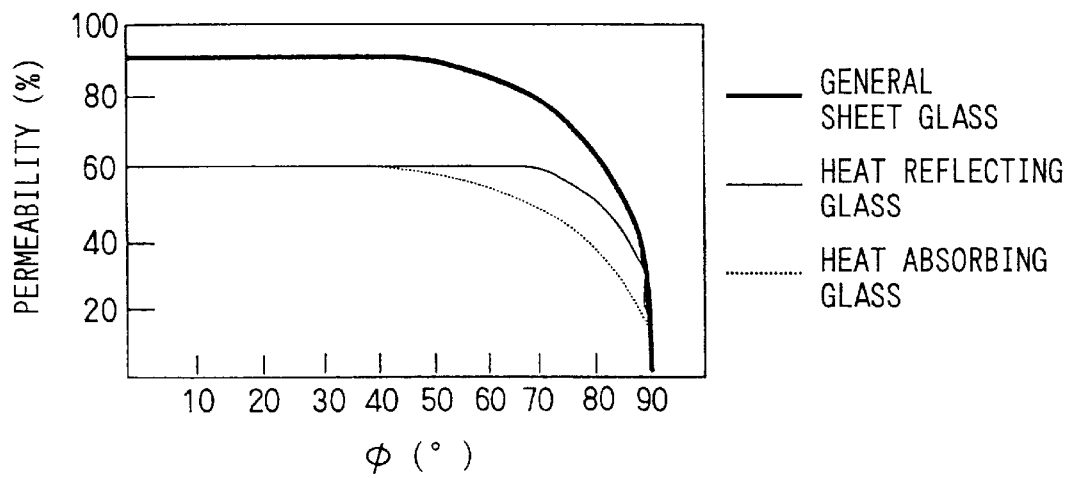
FIG. 7A is a characteristic view showing a relationship between the solar radiation attack angle ($\theta$) of the window glass and the permeability of the window glass.
Figure 7B:
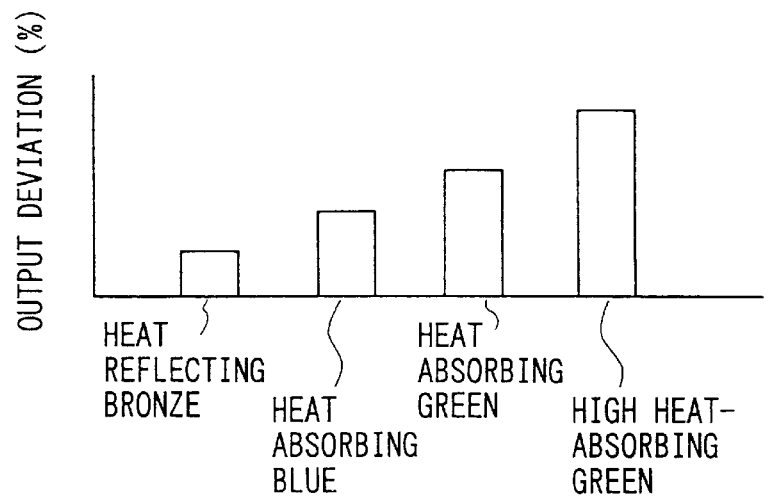
FIG. 7B is a characteristic view showing relationship between specification (state) of the window glass and output deviation.

In this respect, since the solar radiation amount Ts entering the vehicle differs with the permeability characteristic of the window glass provided for the vehicle, the window glass specification of the vehicle is also inputted together when inputting the information unique to the vehicle. Specifically, specification (material) for sheet glass, heat reflective glass, heat absorption glass and the like is inputted. As shown in FIG. 7A, the permeability of solar radiation has a characteristic that the permeability differs with material of window glass of the vehicle and the solar radiation attack angle ($\theta$). Accordingly, since as shown in, for example, FIG. 7B, the output deviation differs with the specification (material) of the window glass, it is possible to correct the solar radiation amount Ts entering the vehicle in accordance with the specification of the window glass on the basis of the output deviation. Thus, the solar radiation amount Ts corresponding to the increment of heat load, due to the heat-receiving amount from solar radiation received by the passenger and the vehicle, is detected with high precision.

Much of the heat-receiving amount by solar radiation is received by the upper half part of the body such as the head and the breast of the passenger. Therefore, when the information unique to the vehicle is inputted in addition to the window glass, vehicle height, color of body, and positional relationship between the seat and the window glass at least as the vehicle shape, and position, size, mounting angle and the like of the window glass are inputted, so that an accurate solar radiation attack angle ($\theta$) is determined. Thus, the solar radiation amount Ts entering into the vehicle compartment can be detected with higher precision.

At step 380 which is target temperature calculation means, on the basis of the operation mode, the inside air temperature Tr, the outside air temperature Tam, the set temperature Tset (front seat, rear seat) read at step 320 and the solar radiation amount Ts determined at step 370, a target air temperature TAO at the front seat and the rear seat of air to be blown in the vehicle compartment will be calculated using numerical formula (1) and numerical formula (2). The temperature and the air flow amount of conditioned air to be blown from each air outlet port, and a control amount for controlling the air-blowing direction into the vehicle compartment are determined by the target air temperature TAO.

Here, the target air temperature TAO on the front seat side and on the rear seat side is separately independently calculated. At that time, the solar radiation amount Ts is determined by using an average value in the front seats on the left and right sides and in the rear seats on the left and right sides respectively.

$$TAO(\text{front seat})=Kset \times Tset(\text{front seat})-Kr \times Tr-Kam \times Tam-Ks \times Ts(\text{front seat})+Kd(\text{front seat}) \times [Tset(\text{front seat})-Tset(\text{rear seat})]+C \quad \text{[Formula 1]}$$

$$TAO(\text{rear seat}) = Kset \times Tset(\text{rear seat}) - Kr \times Tr - Kam \times Tam - Ks \times Ts(\text{rear seat}) + Kd(\text{rear seat}) \times [Tset(\text{rear seat}) - Tset(\text{front seat})] + C \quad \text{[Formula 2]}$$

where Kset, Kr, Kam, Ks, Kd (front seat) and Kd (rear seat) are gains, and C is a constant for correction.

At step 390, based on the target air temperature TAO on the front seat side and the rear seat side, air conditioning control means for outputting and controlling each control amount such as blower output voltage, first and second air mix doors 235a, 235b and amounts of rotation of other various doors is carried out. Further, in the embodiment, on the basis of the solar radiation direction (θ, φ) determined at step 350, air flow distribution control means for distributing the air flow amount for each passenger seat is controlled. For the passenger seat in which the passenger receives heat by solar radiation, control for increasing the air flow distribution as compared with the other seats is performed.

This air flow distribution control is control means which performs control on the basis of the air flow distribution ratio that has been stored in the ROM within the air conditioning controller 40 in advance. In other words, rotation positions of a front-rear air-distribution adjusting door 236, the front seat lateral air-distribution adjusting doors 251a, 252a and rear seat lateral air distribution adjusting doors 251b, 252b are controlled in response to the solar radiation attack angle (θ) and the solar radiation lateral angle (φ) of the entering solar radiation, for independently distributing the air flow for each passenger seat. Accordingly, the distribution ratio of the flow amount of the conditioned air to be blown out to four passenger seats located in front and behind, and left and right of the vehicle is controlled to thereby perform independent air-flow distribution control.

With reference to FIGS. 8A to 8I, an example of the airflow distribution control will be now described. These drawings represent air flow distribution at the passenger seats when, with the solar radiation attack angle (θ) (for example, 60°) made constant, the solar radiation lateral angle (φ) is made variable within a range of φ1(0°) to φ8(315°). In FIGS. 8B to 8I, ①, ②, ③ and ④ designate the passenger seats in FIG. 8A respectively. On a passenger seat into which solar radiation shines, the air-flow distribution control is performed so that the air flow distribution for this passenger seat is increased as compared with the other seats. Thus, in accordance with the solar radiation direction (θ, φ), the air-blowing amount is controlled by the control amount responsive to an increment of heat load received by the passengers and the vehicle. In this respect, FIG. 8A shows when the solar radiation attack angle (θ) is 60°. However, the solar radiation attack angle (θ) is set by determining the air flow distribution of 0° to 90° in each 10° increments. Each control amount in executing the former air conditioning control is stored in the ROM within the air conditioning controller 40 in advance.

Incidentally, if there is a shelter at the shelter determining means at step 360, it is determined that "a shelter is present". That is, when the solar radiation does not shine into the vehicle compartment, the solar radiation amount Ts is not corrected. In this case, through the use of the intensity of solar radiation detected by the solar radiation sensor 50, the target air temperature TAO is determined to compute the control amount. Accordingly, the air flow distribution control is not performed, but air is uniformly blown to each seat.

According to the vehicle air conditioning system 10 of the first embodiment, the solar radiation direction (θ, φ) entering the vehicle compartment, relative to the solar position and the travel direction of the vehicle, is determined, so that the heat-receiving amount of the vehicle is determined. The heat-receiving amount of the passenger seated on the seat becomes maximum when the solar radiation attack angle (θ) is close to about 30°, and the heat-receiving amount of the vehicle compartment becomes maximum when the solar radiation attack angle (θ) is close to about 60°.

Accordingly, by accurately detecting the solar radiation attack angle (θ) entering the vehicle, the solar radiation amount entering the vehicle is detected more accurately. In the present first embodiment, solar-radiation direction calculating means (step 350) for calculating the solar-radiation entering direction (θ, φ) and the solar-radiation amount calculating means (step 370) for determining the solar radiation amount entering the vehicle are provided, and the solar radiation amount Ts is corrected, so that the solar radiation amount Ts entering into the vehicle compartment is detected more accurately.

In order to accurately determine the solar radiation attack angle (θ) entering the vehicle, among the road information, information having the inclination angle Y' of the road is inputted from the navigation system 30, so that the attack angle data Y determined from the positional information (X,Y) is corrected. Accordingly, it is possible to accurately determine the solar radiation attack angle (θ) entering the vehicle, and to accurately calculate the increment of heat load entering the vehicle. As a result, the detection precision of the solar radiation amount Ts is improved.

The output characteristic of the solar radiation amount Ts obtained by detecting with the solar radiation sensor 50 using the photodiode 510 is generally deteriorated except for the solar radiation attack angle (θ) close to 90°. In the first embodiment, correction consistent with the output characteristic of this solar radiation sensor 50 is performed, so that the increment of heat load received by the passengers and the vehicle is accurately detected.

For example, the correction value of the solar radiation amount Ts is set to become maximum when the solar radiation lateral angle (φ) and the solar radiation attack angle (θ) are in a range of 0° and 75° (with 60° as a peak), as shown in FIGS. 6B and 6C. Thus, the increment of heat load consistent with the heat-receiving amount due to solar radiation can be detected, and the increment of heat load in accordance with the solar radiation direction (φ,θ) can be accurately detected.

Since the output deviation differs with the specification of the window glass, among the information unique to the vehicle, the solar radiation amount Ts entering the vehicle is corrected in accordance with the specification of window glass on the basis of the output deviation. Accordingly, the solar radiation amount Ts, for the heat-receiving amount of solar radiation received by the passengers and the vehicle, is detected with high precision.

In addition to the specification of window glass, if the vehicle height, the color of the vehicle body, and the positional relationship between the seat and the widow glass are input as the shape of the vehicle, and if the position, the size, the amounting angle and the like of the window glass are inputted in advance, the solar radiation attack angle (θ) is more accurately determined. Thus, the solar radiation amount Ts entering the vehicle compartment is detected more accurately.

Further, shelter determining means (step 360) is provided. In the shelter determining means (step 360), on the basis of road information at least containing positions and heights of a road, structures around the road and road structure and the like, the shelters on the road and in the structures around the road, such as high-rise buildings and mountains in the solar radiation direction (θ, φ) is confirmed in order to determine whether or not the solar radiation entering the vehicle is shielded. When the solar radiation is not shielded, that is, when the solar radiation shines into the passengers and the vehicle compartment, air conditioning control for each passenger seat responsive to the solar radiation amount entering the vehicle is performed. Thus, air conditioning control based on the control amount corresponding to the heat load increment of the passengers and the vehicle due to solar radiation is performed, and the comfort of the passengers in the vehicle compartment is improved.

When the solar radiation is not shielded, the shelter determining means (step 360) controls the air flow distribution means so that the air flow amount is distributed for each passenger seat in accordance with the solar radiation direction (θ, φ) entering the vehicle. In this case, on the passenger seat where the passenger receives heat of solar radiation, the air flow distribution is controlled to be increased as compared with the other seats. Therefore, air conditioning control based on the control amount corresponding to the heat load increment received by the passengers and the vehicle is performed, and the comfort of the passengers is improved.

In the present first embodiment, the shelter determining means (step 360) determines whether or not the solar radiation from the sun is shielded based on the road information. In recent years, however, a VICS (road traffic information communication system) which dispatches meteorological information to each area using radio wave of FM multiplex broadcasting has been adopted in the navigation system 30. Therefore, in this case, it is possible to determine whether or not the solar radiation is shielded at the present position and in the travel direction of the vehicle through the use of the meteorological information.

Figure 9:
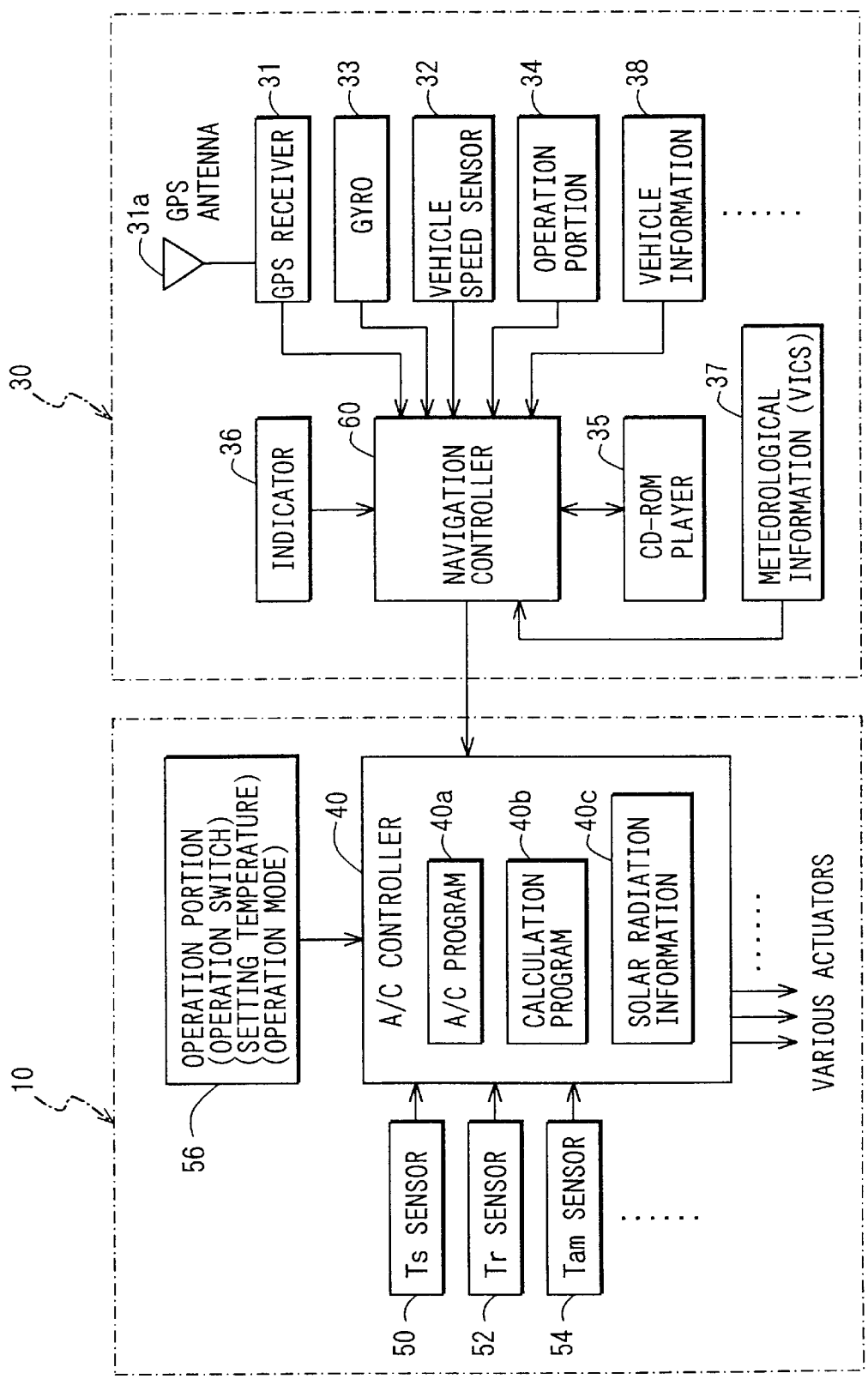
FIG. 9 is a block diagram showing an air conditioning system and a navigation system of an air conditioner for a vehicle according to a variation of the first embodiment.

Specifically, as shown in FIG. 9, a meteorological information input unit 37 is provided. In this case, when a target destination is inputted, a traveling route is selected, and expected passage time along the traveling course, and the meteorological information such as weather, air temperature, precipitation, an amount of clouds, and atmospheric pressure are inputted in the navigation controller 60.

For example, along the traveling course along which the vehicle is traveling from the present position toward the target spot, the expected passage time, and solar radiation intensity and an amount of clouds and the like of the meteorological information to be expected at that time can be input, for calculating the solar radiation amount Ts. When the meteorological information is utilized, the solar radiation amount can be detected with high precision.

A recreational vehicle such as a one box car has a rear air conditioner mounted therein because the interior of the vehicle compartment is large. Even in this case, through the use of only the solar radiation sensor 50 provided in the front part of the vehicle, it is possible to detect the solar radiation for the rear air conditioner with high precision. That is, in this case, there is provided calculating means for predicting the solar radiation direction (φ,θ) in the travel direction of the vehicle based on the navigation system 30, and the heat load increment on the side on which the solar radiation shines is calculated. Accordingly, the solar radiation can be detected with high precision without increasing the number of the solar radiation sensors.

(Second Embodiment)

In the above-described first embodiment, in the detection of the solar radiation amount from the sun, the solar radiation sensor 50 for detecting the intensity of solar radiation is provided. In addition, when there is solar radiation entering the vehicle, the solar radiation amount detected from the solar radiation sensor 50 is corrected. In the present second embodiment, however, the solar radiation sensor 50 is not provided, but the solar radiation amount entering the vehicle is computed within the air conditioning controller 40 on the basis of the solar position.

Figure 10:
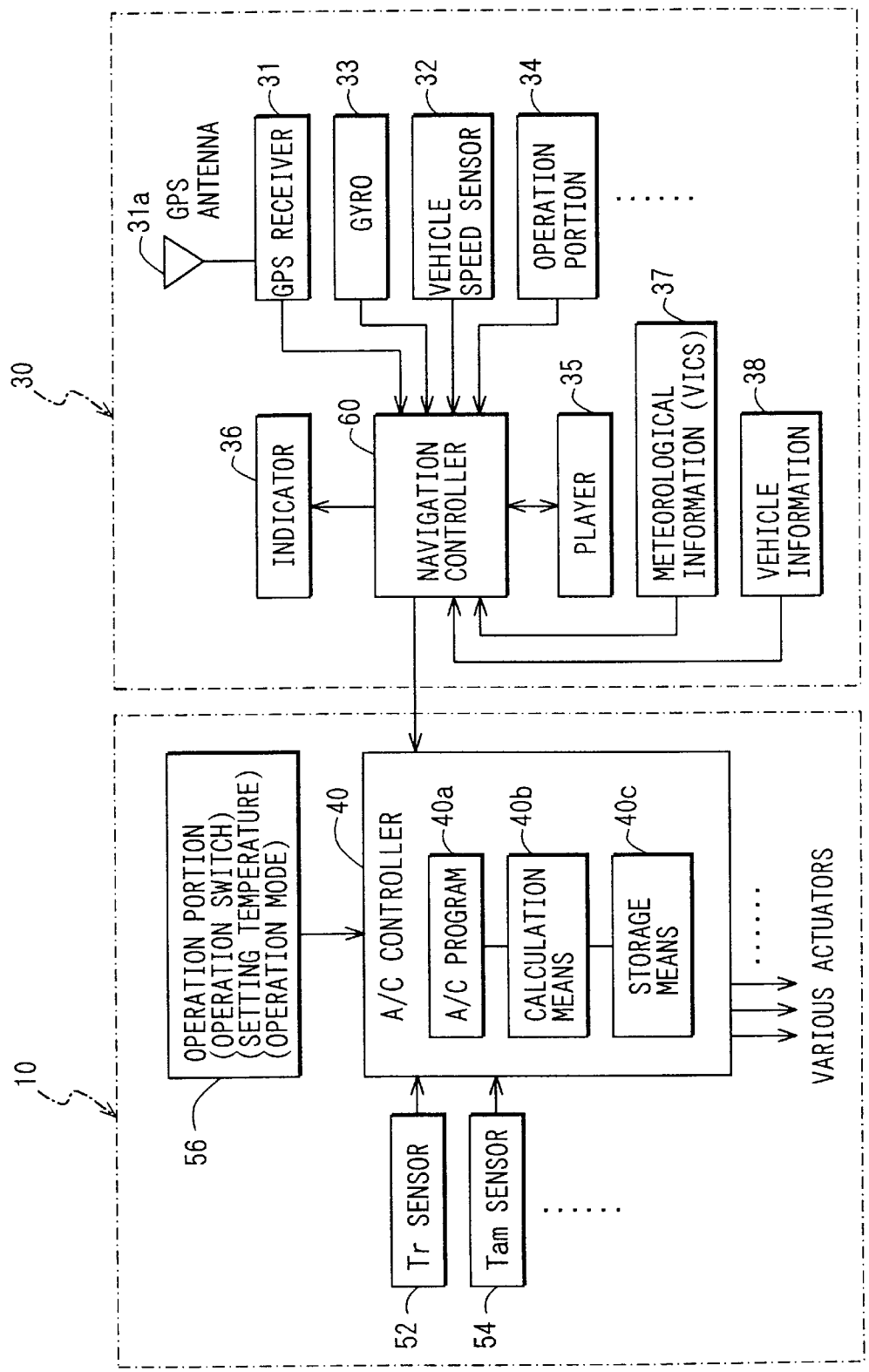
FIG. 10 is a block diagram showing an air conditioning system and a navigation system of an air conditioner for a vehicle according to a second embodiment of the present invention.

First, in the air conditioner according to the second embodiment, the solar radiation sensor 50 for inputting signal into the air conditioning controller 40 is omitted as shown in the block diagram of FIG. 10. In the second embodiment, in order to determine the solar radiation amount in place of the solar radiation sensor 50, solar-radiation amount storage means and solar-radiation amount correction and storage means which have been stored in the storage means 40c of the air conditioning controller 40 in advance are retrieved, so that a direct-reaching solar-radiation amount to be described later, corresponding to the present date and time is determined. Next, on the basis of the solar radiation direction (θ, φ) entering the vehicle, this direct-reaching solar-radiation amount is corrected. In this respect, in FIG. 10, components equivalent to those in the first embodiment are represented by the same reference numerals, and description thereof will be omitted.

Figure 11:
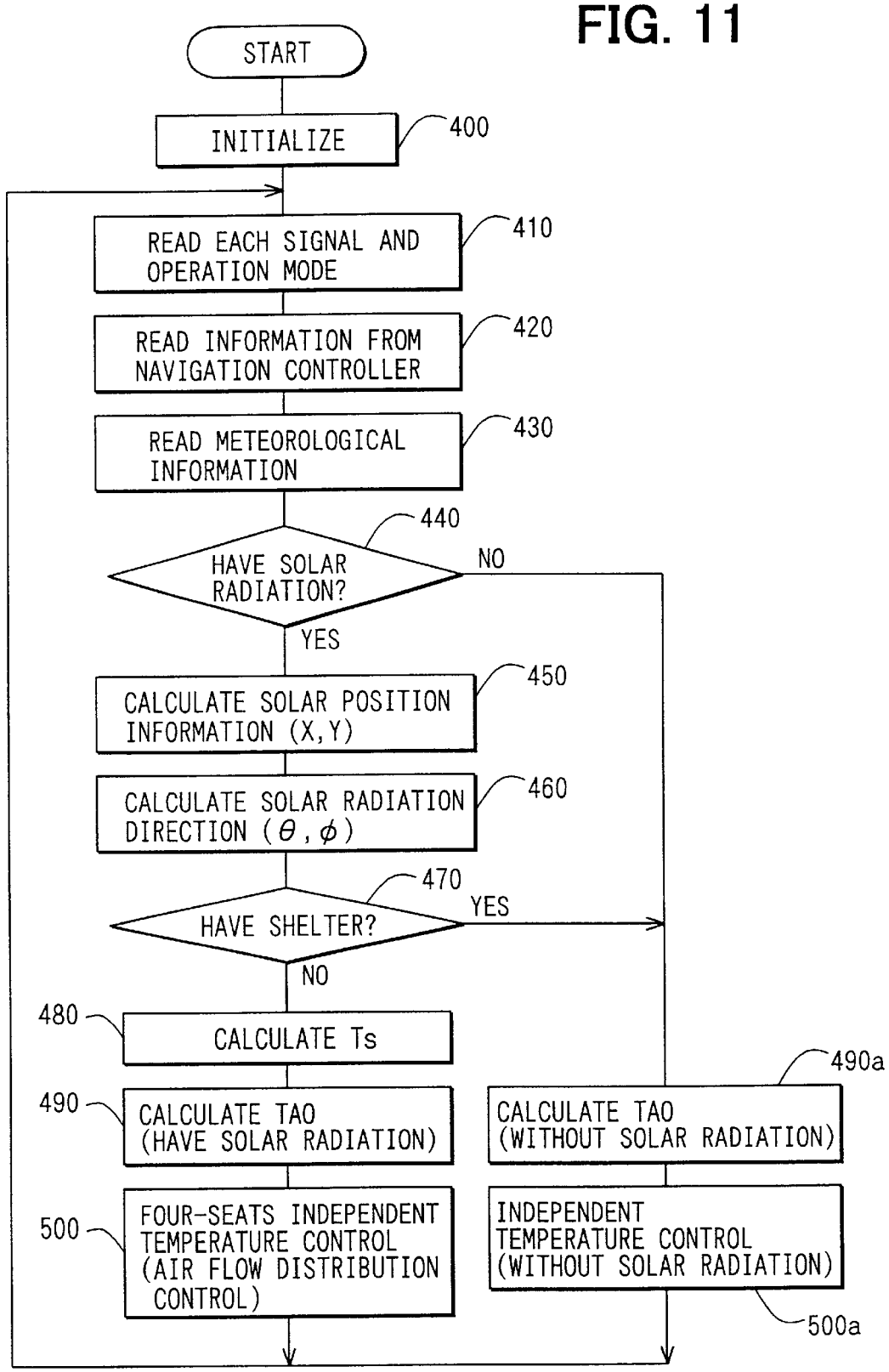
FIG. 11 is a flow chart showing the control process of an air conditioning controller 40 according to the second embodiment.

Next, on the basis of the control process of the air conditioning program 40a shown in FIG. 11, a control operation of the present second embodiment will be now described. First, when the ignition switch is turned ON, and power is supplied to each controller 40, 60, various information and input signals of each sensor are inputted into the air conditioning controller 40. Specifically, when an air-conditioning operating switch (not shown) is actuated, the storage contents and the like of the data processing memory (RAM) is initialized at step 400. Next, at step 410, each signal of the environmental conditions such as inside air temperature Tr detected by the inside air temperature sensor 52, outside air temperature Tam detected by the outside air temperature sensor 54, and set temperature Tset set by the passenger are inputted, and the number of the passengers and presence or absence of operation of the rear cooler in the operation mode will be inputted. Here, the description will be made of the four-seat independent temperature control in which the number of passengers is inputted as four persons, and the operation mode without the operation of the rear cooler is set.

At step 420, the present data and time (the date and hour) is read from the navigation controller 60. Further, through the use of the gyro 33, the vehicle speed sensor 32 and the GPS antenna 31a, information is read. The information includes vehicle position information having the present position and the travel direction X' of the vehicle computed by the GPS receiver 31, road information including road construction and topography such as structures around the road and the inclination angle Y' of the road concerning the present position and the travel direction X' of the vehicle, and information unique to the vehicle such as the vehicle shape and the window glass specification that have been inputted by the vehicle information input means 38. (Step 420 corresponds to step 340 of the first embodiment)

At step 430, the present position obtained from the meteorological information input means 37 is input. Further, at step 430, expected passage time along a traveling course along which the vehicle is traveling, and the meteorological information such as weather, air temperature, precipitation, an amount of clouds, and atmospheric pressure that are expected at that time are input. At step 440, it is determined, from the read meteorological information, whether or not there is solar radiation on the traveling course along which the vehicle is traveling. That is, at step 440, it is determined, from the information of, for example, the weather, the air temperature, the precipitation, the amount of clouds, and atmospheric pressure, and the like, whether or not solar radiation from the sun shines onto the earth's surface. In this case, when it is determined that "there is solar radiation", the control program will proceed to the next step 450, and when it is determined that "there is no solar radiation", the control program will proceed to the next step 490*a*.

At step 450 which is solar position retrieval means, on the basis of the present date and time read at step 420, the positional information (X, Y) representing the solar position that changes depending on the date and time is determined from the solar position retrieval map. (This step corresponds to step 340*a* of the first embodiment.) Next, at step 460 which is the solar-radiation direction calculating means, the solar radiation direction (θ, φ) entering the vehicle is calculated based on the positional information (X, Y), the travel direction X' of the vehicle read from the navigation controller 60 at step 420, and the inclination angle Y' of the road and the vehicle shape information. (Step 460 corresponds to step 350 of the first embodiment.

At step 470 which is shelter determining means, it is determined whether or not the solar radiation entering from the sun into the vehicle in direction with the solar radiation lateral angle (φ) and the solar radiation attack angle (θ) determined by the solar-radiation direction calculating means, is shielded. That is, on the basis of the road information read at step 420, the road structure and structures around the road, for example, shelters such as high-rise buildings and mountains are confirmed, and it is determined whether or not the solar radiation entering the vehicle is shielded. Step 470 corresponds to step 360 of the first embodiment. If there is no shelter, it will be determined to be "No shelter" and the solar radiation amount Ts entering the vehicle will be computed at step 480 that is solar-radiation amount calculating means.

In the present second embodiment, on the basis of the present date and time read at step 420, the solar-radiation amount storage means and the solar-radiation amount correction and storage means which have been stored in the storage means 40*c* within the air conditioning controller 40 in advance are retrieved, so that the direct-reaching solar-radiation amount, corresponding to the present date and time is determined. Further, on the basis of the solar radiation direction (θ, φ), the direct-reaching solar-radiation amount is corrected and determined.

Among the storage means, when the solar-radiation amount storage means is used as a reference to the solar radiation amount Ts, and when the attack angle data Y is used as a parameter, the solar radiation amount reaching the vehicle is determined for each date and time, as shown in FIG. 12A. The solar-radiation amount retrieval map is set for each area. The solar radiation amount is determined from the direct-reaching solar-radiation amount when the sunlight during fine weather reaches the earth's surface. It is determined from, for example, the direct-reaching solar-radiation amount $T_{nd}$.

$I_{nd} = I_o \times P^{1/\sin h}$ (where $I_o$ is a solar constant, P is atmospheric permeability, h is solar altitude).

Hear, the solar constant $I_o$ is constant throughout the year. However, the atmospheric permeability P differs with atmospheric dirty condition, the direct-reaching solar-radiation amount $I_{nd}$ differs with a city or province including season and time. In this respect, the atmospheric permeability P that differs with area, date and time is stored in the storage means 40*c* within the air conditioner 40 in advance, and the direct-reaching solar-radiation amount can be determined on the basis of the position of the vehicle, the date and time.

The other one of solar-radiation correction and storage means is a solar-radiation amount correction coefficient retrieval map in which a correction coefficient for calculating the direct-reaching solar radiation amount $I_{nd}$ determined by the solar radiation amount information storage means to the solar radiation amount Ts entering the vehicle has is set. As shown in FIG. 12B, using the passenger seat as a parameter, a correction coefficient corresponding to the solar radiation direction (φ,θ) entering the vehicle is set. In this respect, the correction coefficient of this FIG. 12B is determined by experiment, and will be described hereinafter.

Figure 13A:
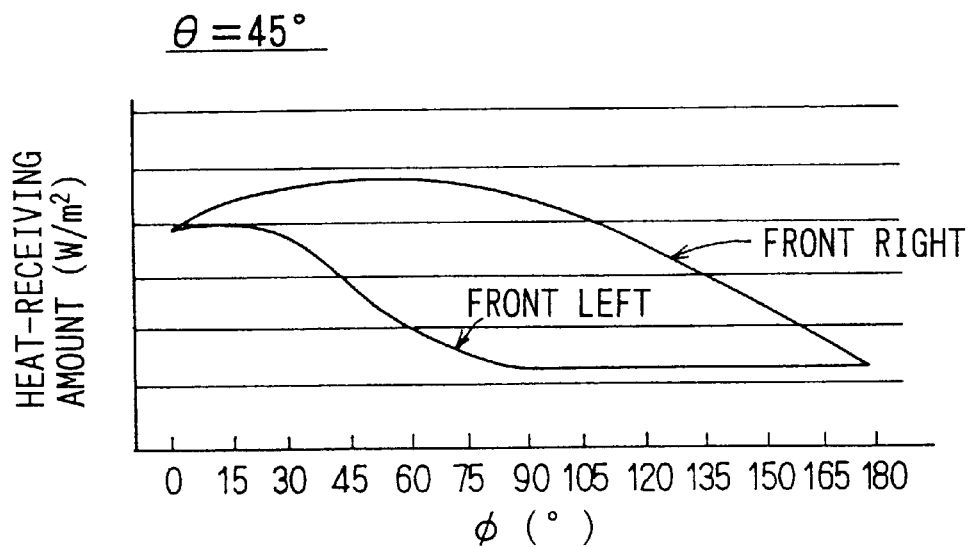
FIG. 13A is a characteristic view showing a relationship between the solar radiation lateral angle ($\phi$) and a quantity of heat received (heat-receiving amount) at the passenger seats when the solar radiation attack angle ($\theta$) is constant.
Figure 13B:
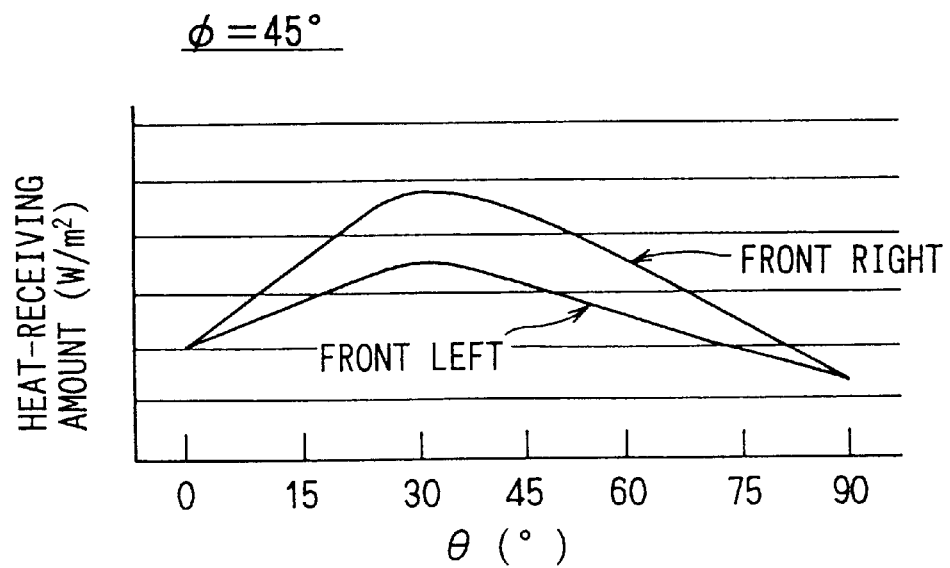
FIG. 13B is a characteristic view showing relationship between the solar radiation attack angle ($\theta$) and a quantity of heat received (heat-receiving amount) at the passenger seats when the solar radiation lateral angle ($\phi$) is constant.

FIG. 13A shows one example, and represents characteristics of heat-receiving amount at the front seat on the right side and at the front seat on the left side when the solar radiation lateral angle (φ) is changed while the solar radiation attack angle (θ) is made constant at 45°. FIG. 13B represents characteristics of heat-receiving amount at the front seat on the right side and at the front seat on the left side when the solar radiation attack angle (θ) is changed while the solar radiation lateral angle (φ) is made constant at 45°. Either heat-receiving amount is also a heat load increment by solar radiation. When the solar radiation attack angle is constant at 45°, the heat-receiving amount at the front seat on the right side increases when the solar radiation lateral angle (φ) is 0 to 105°, and the heat-receiving amount at the front seat on the left side increases when the solar radiation lateral angle (φ) is 0 to 45°.

When the solar radiation lateral angle (φ) is constant at 45°, the heat-receiving amount at the front seats on the left and right sides becomes peak when the solar radiation attack angle (θ) is 15 to 45°. On the basis of these experimental data results, the correction coefficient is determined in accordance with the solar radiation direction (θ, φ) for each passenger seat. Accordingly, on the basis of the solar radiation direction (θ, φ) entering the vehicle determined at step 460, the correction coefficient can be determined, and the solar radiation amount Ts is determined by multiplying the direct-reaching solar radiation $I_{nd}$ amount by this correction coefficient.

In other words, the direct-reaching solar-radiation amount $I_{nd}$ is determined from the present position of the vehicle, the date and time, the correction coefficient in accordance with the solar radiation direction (θ, φ) is determined, and the solar radiation amount Ts is computed by multiplying the direct-reaching solar-radiation amount $I_{nd}$ by this correction coefficient. Thus, without using the solar radiation sensor 50 provided in the front part of the vehicle compartment, the solar radiation amount Ts entering the vehicle is determined for each passenger seat. Since this solar radiation amount Ts differs with the permeability characteristic of the glass provided for the vehicle, the window glass specification can be inputted together when the information unique to the vehicle is inputted.

Next, at step 490 which is the target temperature calculating means, the target air temperature TAO for determining the control amount is determined on the basis of the operation mode, the inside air temperature Tr, the outside air temperature Tam, and the set temperature Tset (front seat, rear seat) that have been read at step 410 and the solar radiation amount Ts determined at step 480. That is, the temperature of conditioned air to be blown from each air outlet port, the air flow, and the air-blowing direction in the vehicle compartment is determined based on the control amount determined by the target air temperature TAO. Step 490 corresponds to step 380 of the first embodiment.

Next, at step 500, on the basis of the target air temperature TAO on the front and rear seat sides, the blower output voltage and each control value such as rotation amounts of the first and second air mix doors 235a, 235b and other various doors are outputted and controlled. Further, on the basis of the solar radiation direction (θ,φ) determined at step 460, air flow distribution control for distributing the air flow amount for each passenger seat is performed. Specifically, on the passenger seat where the passenger receives heat by solar radiation, control in which the air flow distribution is more increased as compared with the other seats is performed. Step 500 corresponds to step 390 of the first embodiment.

Incidentally, when it is determined that a shelter is present in the shelter determining means at step 470, it is determined that no solar radiation shines into the vehicle compartment, and the control program proceeds to step 490a. Since there is no solar radiation amount Ts in this case, among the calculation expressions for the target air temperature TAO determined at step 490, the solar radiation amount Ts=0 is used to determine the target air temperature TAO. At step 500a, air conditioning control in which each control amount is outputted on the basis of the target air temperature TAO without solar radiation will be performed, and the above-described air-flow distribution control from the air-flow distribution control means is not performed.

In the solar radiation sensor 50 provided in the front part within the compartment, detection precision of the solar radiation amount is frequently deteriorated in accordance with the solar radiation direction (θ, φ) entering the vehicle. Particularly, in a position having low solar radiation attack angle (θ) (for example, about 15° to about 45°) at which the heat-receiving amount of the passenger, due to solar radiation entering from the front side of the vehicle, is increased, the output sensitivity characteristic is deteriorated. Further, in a case of an incident lateral angle φ at which the solar radiation sensor cannot receive light because it has been provided in the front part within the vehicle compartment, there are a problem in which the solar radiation amount cannot be accurately detected.

In the second embodiment, the solar radiation amount Ts is determined without using the solar radiation sensor 50 on the basis of the present date and time obtained from the navigation system 30, the present position and the travel direction X' of the vehicle obtained from the vehicle positional information, and the solar positional information (X, Y) determined from the solar position retrieval means, in accordance with the direct-reaching solar-radiation amount determined from the solar-radiation amount calculating means, the solar radiation direction (θ, φ) determined from the solar-radiation direction calculating means, and the correction coefficient obtained from the solar-radiation amount correction means. Therefore, it is possible to correspond to the solar radiation direction (θ, φ) entering the vehicle and to determine the solar radiation amount Ts for each passenger seat. Thus, the solar radiation amount Ts in response to the heat-receiving amount of the passenger can be detected.

Along the traveling course on which the vehicle is traveling from the present position toward the target spot, the expected passage time and the meteorological information expected at that time are inputted. Further, the solar radiation determining means is provided for determining whether or not the solar radiation from the sun shines onto the earth's surface from information such as the weather, the air temperature, the precipitation, the amount of clouds, and the atmospheric pressure of the meteorological information, so that the presence or absence of solar radiation is easily detected.

In the second embodiment, the solar radiation amount Ts is determined without using the solar radiation sensor 50. Similarly, even in the outside air temperature sensor 54, among the meteorological information along the traveling course of the vehicle from the meteorological information input means 37, the air temperature data can be inputted into the air conditioning controller 40.

Even in the inside air temperature sensor 52, the input means into the operating unit 34 of the navigation system 30 is made into, for example, voice input, and in place of the detected value of the inside air temperature Tr, voice such as "warm" and "cold" is inputted, so that the inside air temperature information can be inputted from the navigation controller 60. Thus, without using the outside air temperature sensor 54 and the inside air temperature sensor 52, the air conditioning control can be performed based on information from the navigation controller 60. As a result, the component cost can be reduced.

For example, the operating unit 34 of the navigation controller 60 can be provided with traveling course setting means for setting a traveling course from the present position of the vehicle toward the target spot always or every time the operation is performed, on the basis of the above-described information of the meteorological information input means 37. In this case, the traveling course setting means predicts the solar radiation amount at a predetermined arrival vehicle position. Further, when the predicted solar radiation amount changes higher than a predetermined level relative to the present solar radiation amount, the air conditioning control can be performed in such a manner that the predicted value of the solar radiation amount is gradually changed before the predetermined arrival vehicle position is reached. Accordingly, the air conditioning operation can be smoothly controlled and the comfort of the passenger is improved.

Figure 14:
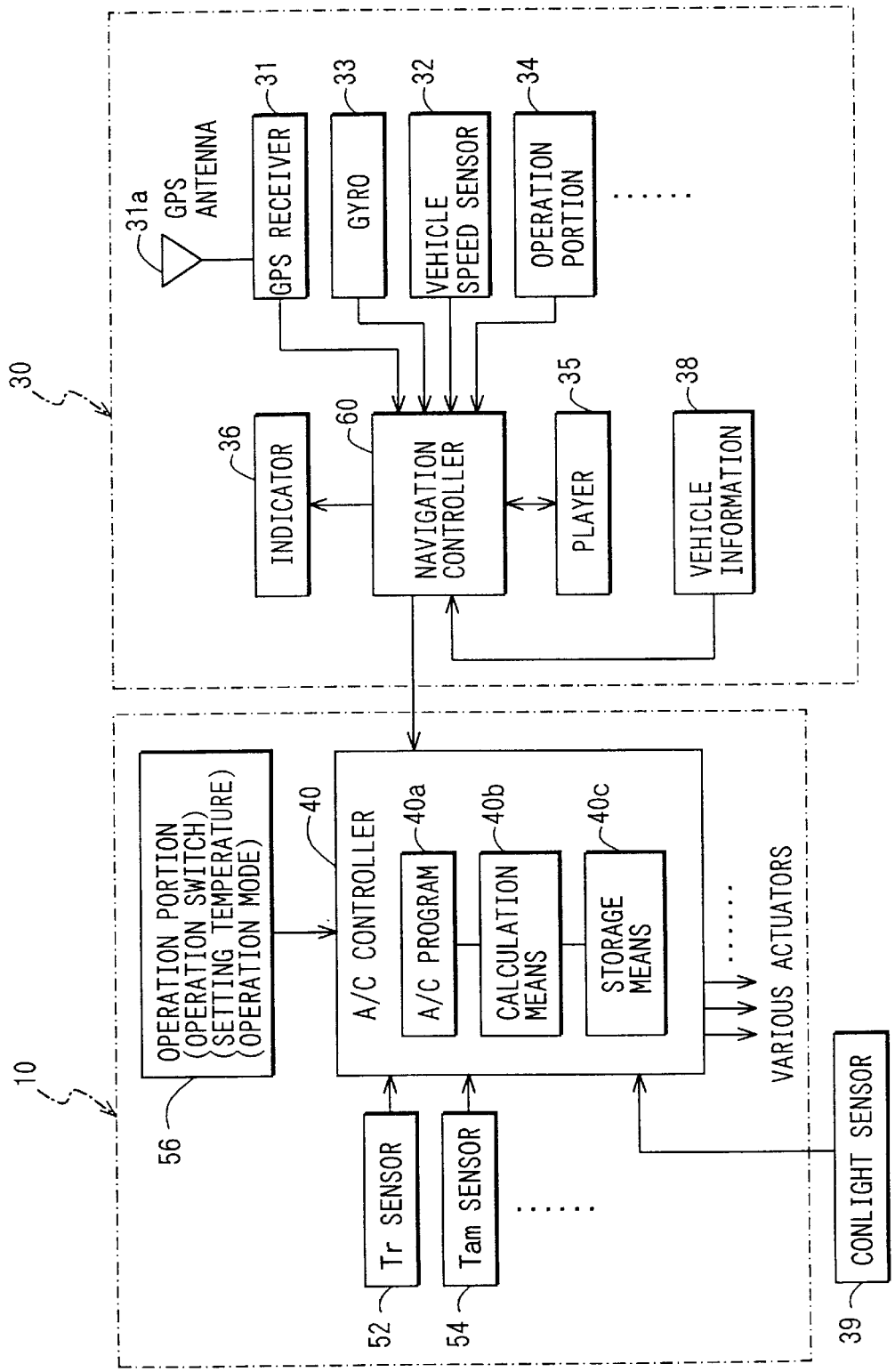
FIG. 14 is a block diagram showing an air conditioning system and a navigation system of an air conditioner for a vehicle according to a modification of the second embodiment of the present invention.

In the second embodiment, solar radiation determining means, for determining whether or not the solar radiation from the sun shines onto the earth's surface from meteorological information such as the weather, the air temperature, the precipitation, the amount of clouds, and the atmospheric pressure, is described. However, the present invention is not limited thereto, but a conlight sensor 39 can be used as the solar radiation determining means as shown in FIG. 14. The conlight sensor 39 is ambient light detection means for lighting a headlamp device of the vehicle. Signal from the conlight sensor 39 is input into the air conditioning controller 40, and when the detection intensity of illumination exceeds a predetermined value, it is determined that "there is solar radiation". Thus, the presence or absence of solar radiation can be determined at lower cost as compared with a case where the meteorological information input means 38 is inputted into the navigation system.

(Another Embodiment)

In the above-described embodiments, when the four-seat independent temperature control is performed as the operation mode, the solar radiation amount Ts in the solar radiation direction (θ, φ) entering the vehicle is detected, and the air flow distribution control for each passenger seat by the air flow distribution means is performed so that the air conditioning control for the heat load increment due to the solar radiation amount Ts is performed. However, the present invention is not limited thereto, but the similar air conditioning control may be performed for only the driver's seat, two-seat independent temperature control for the front seats on the left and right sides or the rear seats on the left and right sides, three-seat independent control for the left side and the right side of the front seat and the rear seat, and the like.

In the above-described embodiments, the solar position storage means, the solar-radiation amount storage means, the solar-radiation amount correction and storage means and the like are stored in the storage means 40c within the air conditioning controller 40. However, the present invention is not limited thereto, and they may be stored in DVD or the like within the navigation system 30. Thus, the DVD can store more enormous amount of information than the ROM, and the processing time can be shortened.

Further, in the above-described embodiments, the solar radiation direction (θ, φ) is computed by the control process on the side of the air conditioning controller 40. However, the calculation process and the like can be performed on the side of the navigation controller 60 to output the calculation result to the side of the air conditioning controller 40 for performing the air conditioning control.

What is claimed is:

1. A solar radiation detection unit for a vehicle, provided for a vehicle equipped with a navigation system which detects a present position and a travel direction of the vehicle, and guides the vehicle in travelling based on the detected present position and the detected travel direction of the vehicle, and road information including information of structures at least around a road previously stored, the solar radiation detection unit being for detecting intensity of solar radiation entering a vehicle compartment, comprising:

solar position storage means in which solar position information representing a solar position which changes in accordance with the date and time is stored in advance;

solar-radiation amount determining means for determining a basic solar-radiation amount receiving from the sun;

solar-radiation direction calculating means which reads solar position information corresponding to the present date and time from the solar position storage means and the road information around the vehicle detected by the navigation system, and computes presence or absence of solar radiation entering the vehicle and an entering direction on the basis of the solar position information and the road information; and solar-radiation amount calculation means which determines the solar radiation amount entering the vehicle on the basis of calculation results of the solar-radiation direction calculating means and the solar-radiation basic amount of the solar-radiation amount means, wherein the solar-radiation amount calculation means corrects the solar radiation amount based on information unique to the vehicle.

2. The solar radiation detection unit for a vehicle according to claim 1, wherein the information unique to the vehicle is at least one of information indicating a height of the vehicle, a color of the vehicle body, a position of a seat, a positional relationship between the seat and a widow glass, and a position, a size, an angle and a permeability characteristic of the window glass.

3. The solar radiation detection unit for a vehicle according to claim 1, wherein the road information concerning the vicinity of the vehicle includes at least information of an inclination angle of the road.

4. A solar radiation detection unit for a vehicle, provided for a vehicle equipped with a navigation system which detects a present position and a travel direction of the vehicle, and guides the vehicle in travelling based on the detected present position and the detected travel direction of the vehicle and road information including information of structures at least around a road previously stored, the solar radiation detection unit being for detecting intensity of solar radiation entering into a vehicle compartment, comprising:

solar position storage means in which solar position information representing a solar position which changes in accordance with date and time is stored in advance;

solar-radiation amount determining means for determining a solar-radiation basic amount which receives from the sun;

solar-radiation direction calculating means which reads solar positional information corresponding to the present date and time from the solar position storage means and the road information around the vehicle detected by the navigation system, and computes presence or absence of solar radiation entering into the vehicle and an entering direction on the basis of the solar position information and the road information; and solar-radiation amount calculation means which determines the solar radiation amount entering into the vehicle on the basis of calculation results of the solar-radiation direction calculating means and the solar-radiation basic amount of the solar radiation amount means, wherein:

when it is determined that a solar radiation attack angle entering into the vehicle between a vehicular horizontal-direction and the solar direction is within a predetermined range from the calculation result of the solar-radiation direction calculating means, the solar-radiation amount calculating means corrects the solar radiation amount to be increased.

5. A solar radiation detection unit for a vehicle, provided for a vehicle equipped with a navigation system which detects a present position and a travel direction of the vehicle, and guides the vehicle in travelling based on the detected present position and the detected travel direction of the vehicle and road information including information of structures at least around a road previously stored, the solar radiation detecting unit being for detecting intensity of solar radiation entering into the vehicle compartment, comprising:

solar position storage means in which solar position information representing a solar position which changes in accordance with date and time is stored in advance;

a solar radiation sensor provided at a predetermined position of the vehicle, for outputting a detection signal responsive to the intensity of the solar radiation;

solar-radiation direction calculating means which reads solar positional information corresponding to the present data and time from the solar position storage means and the road information around the vehicle detected by the navigation system, and computes presence or absence of the solar radiation entering into the vehicle and an entering direction based on the solar position information and the road information; and solar-radiation amount calculating means which determines the solar radiation amount entering into the vehicle, on the basis of calculation results of the solar-radiation direction calculating means and a detected value from the solar radiation sensor, wherein the solar-radiation amount calculating means corrects the detected value from the solar radiation sensor to determine the solar radiation amount.

6. The solar radiation detection unit for a vehicle according to claim 5, wherein:

when a solar radiation attack angle and a solar radiation lateral angle entering the vehicle, between the solar position and the travel direction of the vehicle are at least within a range of 0° and 75° respectively, from the calculation results of the solar-radiation direction calculating means, the solar-radiation amount calculating means corrects the detected value from the solar radiation sensor to be maximum.

7. The solar radiation detection unit for a vehicle according to claim 5, wherein:
the solar-radiation amount calculating means corrects the detected value from the solar radiation sensor in accordance with the characteristic of a window glass corresponding to solar radiation attack angle (θ) entering the vehicle based on the calculation results of the solar-radiation direction calculating means.

8. The solar radiation detection unit for a vehicle according to claim 5,
wherein the solar-radiation amount calculating means inputs information unique to the vehicle including at least the shape of the vehicle into the navigation system, and determines the solar radiation direction (θ, φ) entering the vehicle on the basis of the information unique to the vehicle.

9. The solar radiation detection unit for a vehicle according to claim 5, wherein the solar-radiation amount calculating means has shelter determining means which determines whether or not the solar radiation from the solar position is shielded on the basis of the road information from the solar-radiation direction calculating means, including information of structures around the road, road construction information and topographic information; and
the solar-radiation amount calculating means corrects the detected value from the solar radiation sensor on the basis of the shelter determining means.

10. The solar radiation detection unit for a vehicle according to claim 5, wherein the solar-radiation direction calculating means inputs meteorological information means representing weather conditions at the present time corresponding to the present position and the travel direction of the vehicle into the navigation system, and computes presence or absence of the solar radiation entering the vehicle and the entering direction on the basis of the road information and one of the solar position information and the meteorological information means.

11. The solar radiation detection unit for a vehicle according to claim 1, wherein the solar-radiation direction calculating means inputs meteorological information means representing weather conditions at the present time corresponding to the present position and the travel direction of the vehicle into the navigation system, and computes presence or absence of the solar radiation entering the vehicle and the entering direction on the basis of the road information and one of the solar position information and the meteorological information means.

12. An air conditioner for a vehicle, provided for a vehicle equipped with a navigation system which detects a present position and a travel direction of the vehicle, and guides the vehicle in travelling based on the detected present position and the detected travel direction of the vehicle, and road information including at least positions and height information of a road and structures around the road stored in advance, the air conditioner performing a flow amount control of conditioned air to be blown into respective air outlet ports for plural areas within the vehicle compartment, based on signals from each sensor provided at various positions of the vehicle and various information including the road information from the navigation system, comprising:

vehicle information input means having information unique to the vehicle including at least the shape of the vehicle for determining a solar radiation direction (θ, φ) entering the vehicle;
solar position retrieval means having solar position storage means in which solar position information representing a solar position that changes in response to the date and time, is stored, for determining the solar position that corresponds to the present date and time from the solar position storage means;
solar-radiation direction calculating means which reads the solar position determined by the solar position retrieval means, the road information of the vicinity of the vehicle position detected by the navigation system, and information unique to the vehicle by the vehicle information input means, and which determines the solar radiation direction (θ, φ) entering the vehicle on the basis of the information of the solar position, the road information and information unique to the vehicle;
solar-radiation amount calculating means having solar-radiation amount correction and storage means in which a correction coefficient responsive to the solar radiation direction (θ, φ) is stored for determining the solar radiation amount entering the vehicle correspondingly to a direct-reaching amount of solar radiation reaching the earth's surface determined from the solar position, wherein the solar-radiation amount calculating means determines the correction coefficient by the solar-radiation amount correction and storage means on the basis of the solar radiation direction (θ, φ) determined by the solar-radiation direction calculating means, and determines the solar radiation amount entering the vehicle from the correction coefficient and the direct-reaching amount of solar radiation; and
control means which controls a flow amount of conditioned air to be blown into respective air-outlet ports for plural areas within the vehicle compartment, on the basis of the solar radiation amount determined by the solar-radiation amount calculating means, when solar radiation from the solar position enters the vehicle.

13. The air conditioner for a vehicle according to claim 12, further comprising:
shelter determining means which determines whether or not solar radiation from the solar position is shielded on the basis of the road information containing positions of a road and heights of structures around the road, topographic information of the road and the vicinity thereof, information of structure of the road and the vicinity thereof and the like,
wherein the control means controls the flow amount of conditioned air to be blown into respective air outlet ports for the plural areas within the vehicle compartment in accordance with the determination of the shelter determining means.

14. The air conditioner for a vehicle according to claim 13, wherein:
the control means has air-flow distribution control means which distributes the air flow in such a manner that the air flow on a side on which heat of solar radiation is received is increased in accordance with the solar radiation direction (θ, φ) entering the vehicle; and
the control means controls the flow amount of conditioned air to be blown into respective air outlet ports for the plural areas within the vehicle compartment.

15. The air conditioner for a vehicle according to claim 12, wherein:

the information unique to the vehicle of the vehicle information input means includes at least permeability characteristic of the window glass of the vehicle corresponding to the solar radiation amount and information of seating height for each seat; and the solar-radiation amount calculating means corrects the solar radiation amount entering the vehicle on the basis of the information unique to the vehicle.

16. The air conditioner for a vehicle according to claim 12, wherein:

the solar-radiation amount correction and storage means sets correction coefficients responsive to the solar radiation direction ($\theta$, $\phi$) and plural areas within the vehicle compartment for storage, in order to determine a heat-receiving amount of the passenger for each of the plural areas within the vehicle compartment and received by the vehicle correspondingly to the direct-reaching amount of solar radiation.

17. The air conditioner for a vehicle according to claim 12, further comprising:

solar radiation determining means in which an output signal from ambient light detection means to be used in a headlamp device provided for the vehicle to be automatically lighted in accordance with intensity of illumination in the vicinity of the vehicle, wherein:

the solar radiation determining means determines presence or absence of solar radiation on the basis of a detected value of the ambient light detection means; and the solar-radiation amount calculating means performs calculation of the solar radiation amount in accordance with the determination of the solar radiation determining means.

18. The air conditioner for a vehicle according to claim 12, wherein the navigation system has meteorological information input means which receives, from the outside of the vehicle, meteorological information such as weather and an amount of clouds at the present time corresponding to the present position of the vehicle and the traveling course along which the vehicle is traveling, the air conditioner further comprising:

solar radiation determining means which determines whether or not there is solar radiation on the basis of the meteorological information of the meteorological information input means, wherein the solar-radiation amount calculating means performs calculation of the solar radiation amount in accordance with the determination of the solar radiation determining means.

19. The air conditioner for a vehicle according to claim 18, wherein the control means uses air temperature information of the meteorological information obtained from the meteorological information input means, as outside air temperature information.

20. The air conditioner for a vehicle according to claim 12, wherein:

the navigation system has voice input means for detecting the passenger's voice; and the control means uses voice information which relates to temperature such as "warm, cold" that the passenger produces detected by the voice input means as inside air temperature information, and set temperature set by the passenger to perform air conditioning control in consideration of the voice information and the set temperature.

21. The air conditioner for a vehicle according to claim 12, wherein:

the navigation system has traveling course setting means for setting a traveling course from the present position of the vehicle toward a target spot;

the solar-radiation amount calculating means predicts a solar radiation amount at a predetermined vehicle arrival position that is set by the traveling course setting means; and when the predicted solar radiation amount changes higher than a predetermined level relative to the present solar radiation amount, the control means performs the air conditioning control by changing the present solar radiation amount toward the predicted solar radiation amount before the predetermined vehicle arrival position is reached.

* * * * *